United States Patent
Suzuki et al.

[11] Patent Number: 6,048,589
[45] Date of Patent: Apr. 11, 2000

[54] SUBSTRATES FOR MAGNETIC DISCS, MAGNETIC DISCS AND PROCESS FOR PRODUCING MAGNETIC DISCS

[75] Inventors: Tomio Suzuki, Yokkaichi; Fuminori Takeya, Iwakura; Masahiro Abe, Nagoya, all of Japan

[73] Assignee: NGK Insulators, Ltd., Nagoya, Japan

[21] Appl. No.: 09/188,982

[22] Filed: Nov. 9, 1998

Related U.S. Application Data

[62] Division of application No. 08/793,255, filed as application No. PCT/JP96/01732, Jun. 21, 1996.

[30] Foreign Application Priority Data

Jun. 21, 1995 [JP] Japan ................................ 7-154396
Aug. 17, 1995 [JP] Japan ................................ 7-209442
Feb. 26, 1996 [JP] Japan ................................ 8-61641

[51] Int. Cl.$^7$ .................................................. G11B 5/84
[52] U.S. Cl. .................... 427/554; 427/555; 427/444; 427/301; 427/299; 427/275; 427/129; 427/131
[58] Field of Search ...................... 427/554, 555, 427/444, 301, 299, 275, 131, 129

[56] References Cited

U.S. PATENT DOCUMENTS

| | | |
|---|---|---|
| 5,273,834 | 12/1993 | Hoover et al. |
| 5,586,040 | 12/1996 | Baumgart et al. .................. 364/474.08 |
| 5,595,791 | 1/1997 | Baumgart et al. ...................... 427/554 |

FOREIGN PATENT DOCUMENTS

| | | |
|---|---|---|
| 0536479 | 4/1993 | European Pat. Off. |
| 0536572 | 4/1993 | European Pat. Off. |
| 0626353 | 11/1994 | European Pat. Off. |
| 0652554 | 5/1995 | European Pat. Off. |
| 63-152022 | 6/1988 | Japan . |
| 2-187922 | 7/1990 | Japan . |
| 6-329440 | 11/1994 | Japan . |
| 7-157331 | 6/1995 | Japan . |
| 7-182655 | 7/1995 | Japan . |
| 9-35234 | 2/1997 | Japan . |

*Primary Examiner*—Stevan A. Resan
*Attorney, Agent, or Firm*—Wall Marjama Bilinski & Burr

[57] ABSTRACT

A magnetic disc substrate is provided, which includes a magnetic disc substrate body made of glass and is characterized in that a metal element capable of absorbing light in at least a surface portion of the magnetic disc substrate body, and a texture is formed on a surface of the magnetic disc substrate body. Ions of the metal element are dispersed in the surface portion of the magnetic disc substrate, or the metal element is contained in a composition of the glass constituting the magnetic disc substrate in the form of an oxide. The glass is preferably a crystallized glass a $Li_2O$—$Al_2O_3$—$SiO_2$ based crystallized glass, which particularly preferably contains 65 to 85 wt % of $SiO_2$, 8 to 15 wt % of $Li_2O$, 2 to 8 wt % of $Al_2O_3$, 1 to 5 wt % of $P_2O_5$ and 1 to 10 wt % of $ZrO_2$ and has lithium disilicate ($Li_2O.2SiO_2$) as a main crystalline phase.

4 Claims, 10 Drawing Sheets

FIG_1a
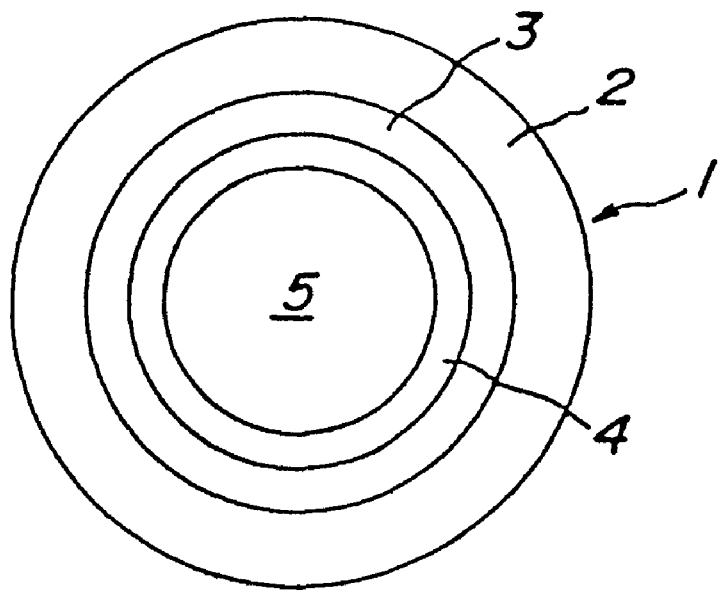
FIG_1b
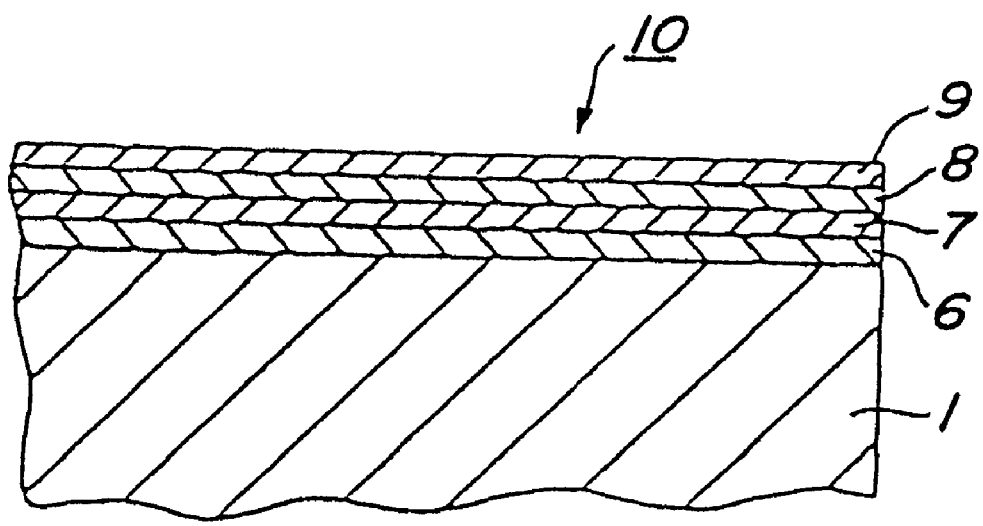

FIG_2a
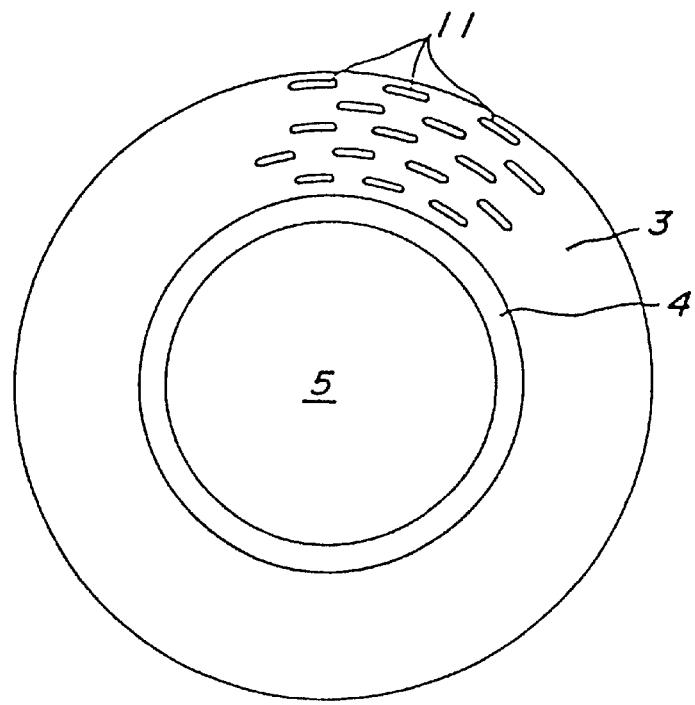
FIG_2b
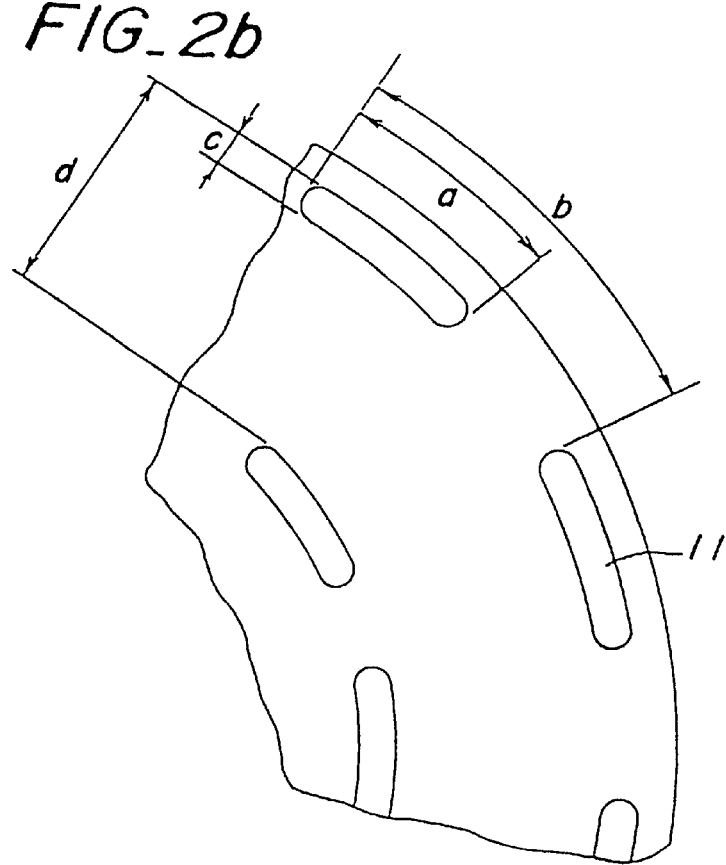

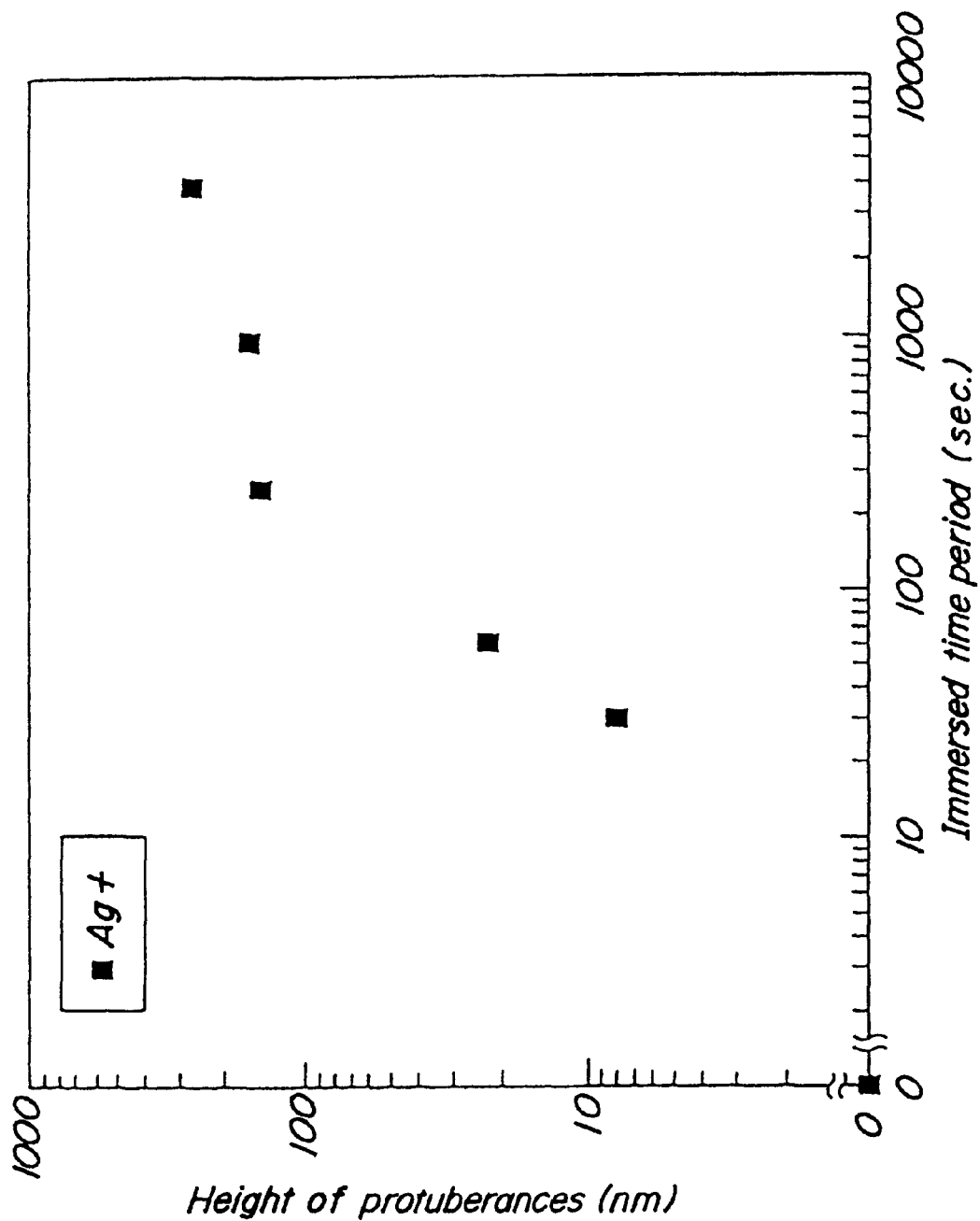

FIG_7

FIG_9

SUBSTRATES FOR MAGNETIC DISCS, MAGNETIC DISCS AND PROCESS FOR PRODUCING MAGNETIC DISCS

This is a divisional application of U.S. Ser. No. 08/793,255, filed Feb. 21, 1997, allowed, which was the National Stage of International Application No. PCT/JP96/01732 filed Jun. 21, 1996 the entirety of which is incorporated herein by reference.

BACKGROUND OF THE INVENTION (1) Field of the Invention

The present invention relates to substrates for magnetic discs, crystallized glass suitable for such magnetic discs, magnetic discs and a process for producing magnetic disc substrates.

(2) Related Art Statement

Principal constituent elements of a magnetic memory apparatus such as a computer are a magnetic recording medium and a magnetic head for magnetically effecting recording and reproduction. As the magnetic recording medium, the flexible disc and the hard disc are known. As to the hard disc, an aluminum alloy has been principally used as its substrate material. However, with the miniaturization of the hard disc drive, a floating amount of the magnetic head conspicuously decreases. Owing to this, extremely high accuracy has been demanded for the flatness and smoothness of the surface of the magnetic disc.

In general, it is necessary to suppress the maximum vertical height of an uneven surface of the magnetic disc to a level not more than half the floating amount of the magnetic head. For example, if the hard disc drive has an allowable floating amount of for example 75 nm, the maximum vertical of the uneven surface of the disc must be not more than 38 nm. Particularly, it has been recently required that the center line average surface height (Ra) of the uneven surface of a reading/writing zone of the magnetic disc substrate is not more than 20 Å. However, the aluminum alloy substrate has a small hardness. Therefore, even though the substrate is polished with use of high precision grinding grains and working machines, the polished surface of the substrate is plastically deformed. Consequently, it is difficult to produce a flat and smooth surface at a high accuracy greater than a given degree. For example, even if the surface of the aluminum alloy substrate body is plated with nickel/phosphorus, the flat and smooth surface cannot be be obtained at the above level.

Further, as the hard disc drive is miniaturized and made thinner, it has been demanded that the thickness of the magnetic disc substrate is made smaller. However, since the aluminum alloy has low strength and low rigidity, it is difficult to maintain the given strength required from the specification of the hard disc drive while making the disc thinner. Particularly, if the magnetic disc substrate is not more than 0.5 mm, the strength of the substrate becomes insufficient, so that the substrate may be warped or vibrated during high speed rotation and during the start of rotation.

Magnetic resistance type heads (MR head) had recently begun to be used, and demand for reducing noise of the magnetic disc has been increasing. In order to reduce such noise, it is known to thermally treat a magnetic film when or after the magnetic film is sputtered. In order to effectively reduce the noise of the magnetic disc by the thermal treatment, the thermal treatment needs to be effected at a temperature not less than 280° C. However, the thermal treating temperature cannot be raised to more than 280° C. in the case of the aluminum alloy substrate.

As the hard disc drive becomes more compact and thinner, there is a strong demand to decrease the thickness of the substrates for the magnetic discs. However, since the aluminum alloy has low strength and low rigidity, it is difficult to make the disc thinner while the given strength required from the specification of the hard disc drive is being maintained. In particular, if the magnetic disc drive is worked to not more than 0.5 mm, there are problems in that the substrate is warped or the surface of substrate is vibrated during a high speed rotation or at the time of starting owing to insufficient strength of the substrate.

In order to solve the above problem, magnetic disc substrates made of glass have been put into practical use in some cases. However, since particularly high strength is required in the case of the substrate for the HDD magnetic disc, chemically tempered glass or glass ceramics need to be used. When such a glass material is used, a magnetically recording surface having a very small Ra of not more than 20 Å can be formed.

Since glass actually has a low strength, it does not have reliability sufficient enough to be used as substrates for HDD type magnetic hard discs. Chemically reinforced glass such as soda-lime glass is also known. However, if such a chemically tempered glass is used as a substrate for magnetic disc, alkaline metal ions contained in the substrate may be dissolved out to corrode a magnetic film.

On one hand, in order to prevent the head sticking phenomenon that the magnetic head slider is stuck to the surface of the magnetic disc when the magnetic disc drive is stopped, it is necessary to form such a texture on the surface of the magnetic disc that is constituted by bumps having heights of around 200 Å. On the other hand, as mentioned above, it is necessary to attain the flatness and smoothness of the surface to a high degree. For this reason, a reading/writing and a landing zone are formed on the surface of the magnetic disc, and the reading/writing zone is finely polished to increase the magnetically recording density, whereas the texture is formed on the landing zone.

The above texture is formed by a photography process or an etching process in the case of a soda lime glass (chemically tempered glass). However, these process are costly, and it takes a larger cost so as to particularly decrease the area of tips of the protuberances constituting the texture.

Further, in the case of the aluminum substrate for the magnetic disc, a metal having a low melting point is sputtered upon the surface of the substrate, which is heated to form minute, semi-spherical protuberances. However, it is difficult and takes a large cost to form such protuberances only upon the landing zone.

Furthermore, as to a magnetic disc substrate made of crystallized glass, a texture is formed through polishing by utilizing the difference in hardness between crystalline grains and the intergranular phase constituting the crystallized glass. However, according to this process, the texture was formed on both the landing zone and the reading/writing zone but it was impossible to form the texture on the landing zone alone.

SUMMARY OF THE INVENTION

Under the circumstances, the present inventors examined use of crystalline glass as a material for magnetic disc substrates. In the crystallized glass, almost all alkaline metal ions contained exist in the crystalline phase, whereas only a very small amount of them exists in the glass matrix. Therefore, such a problem does not occur that the alkaline metal ingredients dissolve out to corrode a magnetic film.

Further, since the crystalline glass has small variations in terms of hardness and bending strength as compared with the chemically tempered glass, the former has more excellent reliability, and is extremely preferred particularly if the thickness of the magnetic disc substrate is as thin as 0.5 mm or less.

However, since the chemically tempered glass is entirely amorphous, the center line average surface roughness (Ra) can be reduced to around 6 Å after polishing of the chemically tempered glass to use it as a magnetic disc substrate. However, since the hardness of the crystallized glass differs between the crystalline phase and the amorphous phase, fine unevenness is irrevocably formed between the crystalline phase and the amorphous phase even after the polishing. As a result, it was difficult to suppress the center line average surface roughness of the polished surface to not more than 20 Å.

For the above reasons, the present inventors discovered that if a specific $Li_2O$—$Al_2O_3$—$SiO_2$ based crystallized glass is used, the center line average surface roughness of its worked surface having undergone the fine polishing could be reduced to not more than 20 Å. Consequently, the inventors specifically disclosed a magnetic disc substrate using such a crystallized glass in the specification of Japanese Patent Application No. 7-174,895.

However, even since then, a demand to record particularly a larger volume of information such as image information in a more compact magnetic disc has become stronger with the development of the multi-media, so that increase in the recording density in the magnetic discs has been demanded. As a result, it is requested that the center line average surface roughness (Ra) of the reading/writing zone be not more than 10 Å. With respect to a substrate made of general crystallized glass and a magnetic disc substrate made of $Li_2O$—$Al_2O_3$—$SiO_2$ based crystallized glass, it is difficult to satisfy the above requirement. With respect to non-crystallized glass and partially crystallized glass having a low crystallinity, it would be possible to control the center line average surface roughness to not more than 10 Å after fine polishing. However, strength of these materials is relatively low so that given strength suitable for the magnetic disc substrates cannot be obtained.

It is an object of the present invention to provide a process for forming a texture upon a desired portion (such as a landing zone) of a surface of a magnetic disc substrate made of glass.

It is another object of the present invention to provide a process which enables the formation of textures upon a number of magnetic disc substrates in a short time with high productivity.

A further object of the present invention is to remarkably reduce the center line average surface roughness (Ra) of the surface of the $Li_2O$—$Al_2O_3$—$SiO_2$ based crystallized glass after the fine polishing while maintaining given crystallinity and strength so that flatness down to particularly not more than 10 Å may be realized.

Further, it is an object of the present invention to obtain a polished surface having Ra of not more than 10 Å and to form a texture at an appropriate height on this surface with respect to the $Li_2O$—$Al_2O_3$—$SiO_2$ based crystallized glass, while maintaining given crystallinity rate and strength.

A first aspect of the present invention is directed to a magnetic disc substrate including a magnetic disc substrate body made of glass and characterized in that a metal element which absorbs light is contained in at least a surface area of the magnetic disc substrate body, and that a texture is formed at the surface of the magnetic disc substrate body. The first aspect of the invention also relates to a magnetic disc characterized by including the above magnetic disc substrate and a magnetic film formed on the magnetic disc substrate.

The first apsect of the present invention also relates to a process for producing the magnetic disc substrate, characterized by incorporation of a metal element absorbing light into at least a surface portion of a magnetic disc substrate body made of glass and forming a texture by irradiating high energy light upon the surface of the magnetic disc substrate body.

A second aspect of the present invention relates to $Li_2O$—$Al_2O_3$—$SiO_2$ based crystallized glass which contains 65 to 85 wt % of $SiO_2$, 8 to 15 wt % of $Li_2O$, 2 to 8 wt % of $Al_2O_3$, 1 to 5 wt % of $P_2O_5$ and 1 to 10 wt % of $ZrO_2$ and has lithium disilicate ($Li_2O.2SiO_2$) as a main crystalline phase.

The second aspect of the present invention also relates to a magnetic disc substrate made of the above crystallized glass and having a flat and smooth surface with a center line average surface roughness (Ra) of not more than 10 Å. The second aspect of the invention also relates to a magnetic disc including this magnetic disc substrate, an under film formed on the flat and smooth surface of the magnetic disc substrate and a metallic magnetic film on the under film.

In order to produce the crystallized glass according to the second aspect, a raw glass which contains 65 to 85 wt % of $SiO_2$, 8 to 15 wt % of $Li_2O$, 2 to 8 wt % of $Al_2O_3$, 1 to 5 wt % of $P_2O_5$ and 1 to 10 wt % of $ZrO_2$ is crystallized by heating with the maximum temperature being 680° C. to 770° C. during the production of the $Li_2O$—$Al_2O_3$—$SiO_2$ based crystallized glass.

The present inventors have been performing investigations to effectively form the textures upon the surfaces of the magnetic disc substrates made of glass, particularly upon the surfaces of the magnetic disc substrates made of crystallized glass. During these investigations, the inventors found out that when a metal capable of absorbing a light having a given wavelength was contained in at least a surface portion of the magnetic disc substrate and a high energy light was irradiated upon the surface of the magnetic disc substrate, that surface portion of the substrate upon which the high energy light was irradiated was protruded. Further, the present inventors have found that if the dimension of the protruded portions is appropriately controlled, such protruded portion would be extremely effectively utilized as a texture on the surface of the magnetic disc substrate or particularly as the texture on the landing zone of the substrate. The present invention has been accomplished based on these findings.

At least the surface portion of the magnetic disc substrate could be appropriately protruded by incorporating the metal in at least the surface portion of the magnetic disc substrate. Particularly, it is easy to make very small the top portions of the protuberances formed by the inventive process. When the total area of the top portions of the protuberances is made very small like this, friction between the magnetic head and the surface of the magnetic disc substrate can be largely reduced.

The total area of the top portions of the protuberances and the ratio between the the total area of the top portions of the protuberances and the area of the landing zone can be arbitrarily controlled only by adjusting the surface area of the substrate upon which the high energy light is to be irradiated, the output of such light, etc. The total area of the top portions of the protuberances means the total area of the portions of the protuberances which are to actually contact a magnetic head slider.

In the first aspect of the present invention, as glass to constitute the magnetic disc substrate, chemically tempered glass such as soda lime glass, crystallized glass, alkaline-free glass, and alumino-silicate glass may be recited. Among them, chemically tempered glass and crystallized glass are preferred from the standpoint of magnitude of strength.

Furthermore, crystallized glass has higher reliability in strength as compared with chemically tempered glass because crystallized glass suffers less variation in hardness and bending strength. Particularly in the case where the thickness of the substrate is less than 0.5 mm, the crystallized glass is extremely preferred in that strength is maintained as desired. As such crystallized glass, $Li_2O$—$Si_2$—$Al_2O_3$-based crystallized glass is preferred. The composition and a production process of novel and preferred crystallized glass will be explained later.

The term "surface portion" of the magnetic disc substrate means a zone of the substrate up to the depth of at least 10 $\mu m$ from the surface thereof. According to the present invention, it is necessary that the above metal ions are contained at least in this surface portion.

As the amount of the metal ions incorporated into the surface portion of the magnetic disc substrate increases, the protuberances formed by the high energy light becomes higher. In addition, there is a correlation among the quantity, the scanning speed and throttled state of the high energy light to be irradiated, the quantity of heat to be applied to the light-irradiating point per unit area for a unit time period, and the height of the protuberances. Thus, these parameters must be appropriately set.

The reason why the protuberances are formed by irradiating the high energy light is not clear, but it is considered as follows. That is, locations of the magnetic disc substrate body where the metal ions are contained in the surface portion absorb the irradiated light at a higher rate so that those locations reach a temperature sufficient to provoke mass transfer. In the surface of the magnetic disc substrate body, working strain caused by the fine polishing remains. It is considered that the volumes of the above locations increase through release of the strain by the heat caused by the high energy light, and that the mass transfer is done by the heat of the high energy light in such a direction that the area of the surface of the substrate polished flat and smooth decreases. Further, it may be considered that the crystalline phase contained in the substrate is transformed to an amorphous phase, and the volume of the relevant portion increases following this transformation.

As the metal mentioned above, metal elements such as silver, copper (I), thallium, manganese, chromium, cobalt, iron, nickel, titanium, vanadium, cerium, and neodium are preferred. As the laser beam to be irradiated upon the surface of the magnetic disc substrate body, YAG laser and argon ion laser beam are preferred. Particularly, YAG laser beam is preferred. Further, the wavelength of the laser beam may be varied depending upon the kind of the metal element incorporated into the surface portion of the substrate.

In order to incorporate the metal element into at least the surface portion of the magnetic disc substrate body, the following two methods may be used.

Method I

The metal ions are incorporated into only a surface portion of the magnetic disc substrate. For this purpose, after the magnetic disc substrate is finely polished, the magnetic disc substrate is immersed into a melted salt containing the given metal ions, so that the metal ions are diffused into the surface portion of the magnetic disc substrate. Alternatively, the metal ions may be diffused into the surface portion of the magnetic disc substrate by applying a paste containing the given metal ions upon the finely polished surface of the magnetic disc substrate and then heating the applied substrate.

In the above method, the silver ions, copper (I) ions and thallium ions are particularly preferred, and among them silver ions are most preferred. As the melted salt for diffusing the metal ions into the substrate, silver nitrate, copper (I) chloride, and thallium nitrate may be recited by way of example.

Method 2

The metal may be incorporated into the entire magnetic disc substrate body. In other words, an oxide containing metal ions may be incorporated as one of the glass components into a raw glass material to constitute the magnetic disc substrate. In this case, a glass preform for the substrate is produced through obtaining a glass material by mixing a metal alone or a metal compound into a powdery glass starting material and melting the mixed powder.

According to the magnetic disc substrate and its producing process, the above metal alone or the metal compound has only to be incorporated into the glass starting material during the producing step of the glass preform in the method similar to a conventional magnetic disc substrate-producing process, which is greatly advantageous from the standpoint of the production. On the other hand, since the method by which the magnetic disc substrate is immersed into the melted salt needs the immersion step, the number of the steps for the production unfavorably increases by one. Furthermore, according to this method II, no variation is likely to occur in terms of the physical properties in every portion of the magnetic disc substrate.

In the method II, the above metal oxide is preferably one or more kinds of metal oxides selected from the group consisting of manganese oxide, chromium oxide, cobalt oxide, iron oxide, nickel oxide, titanium oxide, vanadium oxide, cerium oxide, neodium oxide, silver oxide, copper oxide, and thallium oxide. More preferably, the above metal oxide is one or more kinds of metal oxides selected from the group consisting of manganese oxide, chromium oxide, cobalt oxide, iron oxide, nickel oxide, titanium oxide, vanadium oxide, cerium oxide and neodium oxide. Further, as the metal oxide, one or more kinds of metal oxides selected from the group consisting of silver oxide, copper oxide, thallium oxide, iron oxide, chlonium oxide, and cobalt oxide may be used. As the metal compounds which can be incorporated into the raw glass material, the above metal oxides are preferred. In addition, hydroxides, carbonates, nitrates and phosphates of such metals may be used. Further, in case of chromium oxide, dichromate compound may be used.

The addition amount of the metal or the metal compound to the raw glass material is preferably in a range of 0.01 to 3.0 parts by weight relative to 100 parts by weight of the other component(s) of the raw glass material when calculated in terms of the weight of the metal oxide. If the addition amount is less than 0.01 parts by weight, the high energy light having a given wavelength may not be effectively absorbed. On the other hand, if the addition amount is more than 3.0 parts by weight, evaporation may primarily occur at a location where the light hits, so that a texture having an appropriate shape cannot be easily formed.

The relationship between various above metal oxides and the wavelengths of the high energy lights for effectively forming the textures is shown below.

TABLE 1

| Group | Wavelength range of high energy light (nm) | Kinds of metal oxides |
| --- | --- | --- |
| I | 750~1600 | cobalt oxide, nickel oxide, vanadium oxide, iron oxide, copper oxide |
| II | 400~750 | Chromium oxide, cobalt oxide, neodium oxide, manganese oxide, nickel oxide, copper oxide, silver oxide |
| III | 200~400 | chromium oxide, vanadium oxide, titanium oxide, iron oxide, cerium oxide |

Among the above metal oxides, one kind of them may be incorporated into the substrate. In this case, with respect to the substrate containing the metal oxide belonging to Group I, the high energy light having the wavelength of 750 to 1600 nm is irradiated. With respect to the substrate containing the metal oxide belonging to Group II, the high energy light having the wavelength of 400 to 750 nm is irradiated. Further, with respect to the substrate containing the metal oxide belonging to Group III, the high energy light having the wavelength of 200 to 400 nm is irradiated.

Two or more kinds of the metal oxides may be incorporated into the substrate. In this case, even if the metal oxides selected from the different groups are simultaneously incorporated into the substrate and if the wavelength of the high energy light falls in the wavelength range for any one of these groups, the texture can be effectively formed by using the high energy light having this wavelength. In this case, it is preferable that the ratio of the metal oxide(s) belonging to each of the groups is independently set at 0.01 to 3.0 parts by weight. In addition, the total amount of the metal oxides is preferably 0.01 to 10.0 parts by weight.

The height of the protuberances formed on the landing zone is preferably not more than a half of a floating amount of a magnetic head slider. Thus, the height of the protuberances is more preferably not more than 250 Å, more preferably not more than 200 Å. As the magnetic disc is repeatedly used, the protuberances are abraded. Thus, the height of the protuberances is preferably not less than 50 Å, and more preferably not less than 100 Å.

As the area of the top portions of the protuberances occupying the landing zone increases, the frictional force becomes greater when the magnetic disc begins to turn. For this reason, it is preferable that the ratio of the area of the top portions of the protuberances to the total area of the landing zone is preferably 5% or less. On the other hand, the ratio is preferably not less than 2% so that the abrasion of the protuberances due to sliding between the magnetic head may be decreased.

According to the producing processes of the present invention, a number of the protuberances may be continuously formed by intermittently irradiating the high energy light upon the finely polished magnetic disc substrate while the substrate is being rotated in a constant direction relative to the high energy light. In this case, the high energy light source may be rotated, or the magnetic disc substrate body may be rotated, or both of them may be rotated. In that case, each protuberance is of a planar arc shape extending in the circumferential direction of the magnetic disc substrate. Alternatively, the high energy light may be irradiated in a ring-shaped form upon the landing zone, or the high energy light may be irradiated upon the landing zone through slits in the form of a desired pattern. By so doing, the time required for forming the protuberances can be largely reduced.

In the crystallized glass particularly suitable for the production of the magnetic disc substrate according to the present invention, the main crystal layer is occupied by a lithium disilicate ($Li_2O \cdot SiO_2$) phase and a β-spodumene ($Li_2O \cdot Al_2O_3 \cdot SiO_2$) phase or a β-spodumene solid-solved phase, and the rate of the $SiO_2$ crystal phase is not more than 2% by weight.

In order to produce the substrate made of such a crystallized glass, a glass preform having a composition of 65 to 85 wt % of $SiO_2$, 8 to 15 wt % of $Li_2O$, 5 to 8 wt % of $Al_2O_3$, and 1 to 5 wt % of $P_2O_5$ is prepared. The crystallized glass is produced by heating the glass preform to a thermally treating temperature of 820 to 950° C. Preferably, the center line average surface roughness of the magnetic disc substrate made of the crystallized glass is preferably reduced to not more than 20 Å at at least the surface on the magnetic recording side by finely polishing that surface.

The present inventors have repeatedly made investigations on a $Li_2O$—$SiO_2$—$Al_2O_3$ based crystallized glass to constitute a magnetic disc, and an $Li_2O$—$SiO_2$ phase and an $SiO_2$ phase are almost eliminated by specifying the ratio of the starting materials and crystallizing the glass preform under the above-mentioned temperature condition so that the glass preform may be converted to an $Li_2O$-$2SiO_2$ phase and a β-spodumene ($Li_2O$—$Al_2O_3$-$4SiO_2$) or a β-spodumene solid-solved phase. The main crystalline phase of this crystallized glass is composed mainly of a lithium disilicate phase and the β-spodumene or the β-spodumene solid-solved phase, and the ratio of the $SiO_2$ crystalline phase is not more than 2 wt %.

The present inventors have succeeded in conspicuously reducing the center line surface roughness of the magnetically recording surface of the magnetic disc substrate made of such a crystallized glass down to not more than 20 Å by finely polishing this surface. In addition, the time period required for effecting the above fine polishing can be conspicuously reduced as compared the conventional magnetic disc substrate made of the $Li_2O$—$SiO_2$—$Al_2O_3$ based crystallized glass.

The reason why such function and effect are obtained is considered that the $Li_2O$-$2SiO_2$ phase and the β-spodumene or the β-spodumene solid-solved phase have almost the same hardness, that the main crystalline phase is composed of these phases, and that a ceramic tissue containing almost no crystalline phase made of $SiO_2$ microscopically exhibits almost a monogeneous physical property upon grinding grains.

$Al_2O_3$ is a component necessary for the formation of the β-spodumene or the β-spodumene solid-solved phase. If $Al_2O_3$ is less than 5 wt %, no β-spodumene is produced in the crystalline phase and the content of $SiO_2$ crystalline phase exceeds 2 wt %, so that the center line surface roughness of the surface of the substrate after the polishing is deteriorated.

$SiO_2$ is a fundamental component indispensable for obtaining a crystalline phase such as a lithium disilicate or the like. However, if the content of $SiO_2$ is less than 65 wt %, it is difficult to precipitate the desired crystalline phase, whereas if it is more than 85 wt %, it is difficult to melt the glass.

The present inventors thermally treated the glass preform as mentioned above, and consequently discovered that 820° C. to 950° C. needs to be used as a crystallizing temperature. That is, it is conventionally known that the an $Li_2O$—$SiO_2$—$Al_2O_3$ based glass is crystallized in a wide range of 700° C. to 950° C. However, according to the present invention, the solid solution phase composed preferably of 30–60 wt % of the lithium disilicate and 1–40 wt % of β-spodumene phase and β-spodumene solid solution phase was produced by crystallizing the glass preform having the above composition, while the ratio between the lithium disilicate and the β-spodumene and β-spodumene solid solution phase was successfully not less than 1.0.

Further, the inventors discovered that in order to increase the strength of the crystallized glass to the highest level, the crystallizing temperature is preferably in a range of 820° C. to 920° C., particularly preferably in a range of 820° C. to 900° C.

That is, if the heating temperature for the thermal treatment of the glass preform, namely, the crystallizing temperature, is in a range of 700° C. to 750° C., 30 to 50% of the $Li_2O.SiO_2$ phase and $Li_2O.2SiO_2$ phase occur, and a slight amount of the crystalline phase made of $SiO_2$ is produced. As that time, as the heating temperature increases, both the $Li_2O.SiO_2$ phase and the $Li_2O.2SiO_2$ phase increase. In this case, the center line average surface roughness can be reduced, but the strength of the substrate is low. Thus, such a substrate cannot be practically used.

If the crystallizing temperature is raised to around 800° C., the amount of the $Li_2O.SiO_2$ phase rapidly decreases, whereas the amount of the $Li_2O.2SiO_2$ phase and the $SiO_2$ both rapidly increase. As a result, the center line average surface roughness increases, and also the time required for polishing conspicuously increases.

However, when the crystallizing temperature was raised to 820° C., the $SiO_2$ phase disappeared. At that time, the $Li_2O.2SiO_2$ phase slightly increased. Further, it was found out that the amount of the β-spodumene phase rapidly began to be produced. That is, the crystallization of the $Al_2O_3$ component first proceeded at this temperature at not less than 820° C. so that the β-spodumene phase ($Li_2O.Al_2O_3.4SiO_2$) or the β-spodumene solid solution were produced. Although the similar crystalline structure is produced at the stage before the composition ($Li_2O.Al_2O_3.4SiO_2$) is formed, the ratio among the $Li_2O$, $SiO_2$ and $Al_2O_3$ does not accurately conform with that of $Li_2O.Al_2O_3.4SiO_2$. Thus, the above crystalline structure is called "β-spodumene solid solution".

In the range of 820° C. to 900° C., the lithium disilicate phase, the β-spodumene phase or β-spodumene solid solution phase gradually increase. In this temperature range, the average crystalline particle diameter is not more than 1.0μ, and the strength of the substrate can be kept at an extremely high level. If the temperature exceeds 900° C., the average crystalline particle size of the glass ceramic exceeds 1.0 μm, although the crystalline phase does not largely change. Consequently, the strength of the substrate begins to decrease. If the temperature exceeds 920° C., the strength of the substrate tends to further decrease.

Furthermore, it was clarified that a problem occurs if the β-spodumene phase increases as compared with the original lithium disilicate in the case of the substrate of the present invention. That is, if the β-spodumene particles proceed to grow such that the weight ratio of the lithium disilicate phase/(the β-spodumene phase plus the β-spodumene solid solution in total) may be decreased to less than 1.0, the mechanical strength of the substrate for the magnetic disc decreases.

From the above, it was found that the above weight ratio is more preferably not less than 1.0.

If the amount of the $Al_2O_3$ in the glass preform exceeds 8 wt %, the β-spodumene particles proceed to grow, so that the strength of the substrate for the magnetic disc decreases. Therefore, it is preferable that the amount of the $Al_2O_3$ is not more than 8 wt %.

Further, when the glass preform is heated in the above production process, the production of the crystalline nuclei is preferably promoted by controlling the heating rate at least in a temperature range of not less than 500° C. to 50° C./h to 300° C./h. In addition, the production of the crystalline nuclei is more preferably promoted by holding the glass preform at least in a temperature range of 500° C. to 580° C. for 1 to 4 hours.

One or more other components may be incorporated into the crystallized glass of this type. As a nuclei-forming agent other than $P_2O_5$, metal oxides such as $TiO_2$, $ZrO_2$ and $SnO_2$, a metal such as platinum and a fluoride may selectively be incorporated singly or in a mixed state of two or more kinds of them. Further, 0 to 7 wt % of $K_2O$ may be incorporated. This functions to reduce the melting temperature and the shaping temperature of the glass and also functions to prevent devitrification of the glass during the shaping. In order to exhibit such functions, the content of $K_2O$ is preferably not less than 2 wt %. Further, if the content is more than 7 wt %, the strength of the glass ceramic tends to decrease. One or both of $As_2O_3$ and $Sb_2O_3$ may be incorporated in a total amount of 0 to 2 wt %. These compounds function as a transparency-imparting agent on melting the glass.

Moreover, 0 to 3 wt % of a $B_2O_3$ component, 0 to 3 wt % of a CaO component, 0 to 3 wt % of a SrO, and 0 to 3 wt % of BaO may be incorporated. Substantially no MgO component is preferably incorporated.

In the production of the glass preform, starting materials containing above metal atoms are mixed according to the above weight ratio, and the resulting mixture is melted. As the starting materials, oxides, carbonates, nitrates, phosphates, and hydroxides of the above metal atoms may be recited by way of example. In addition, an air atmosphere, a steam atmosphere and a pressurizing atmosphere may be selectively employed as an atmosphere to crystallize the glass preform under heating.

In order to finely polish the magnetic disc substrate, a known fine polishing such as so-called lapping and polishing may be used.

The crystallized glass itself and the production process thereof according to the second aspect of the present invention will be successively explained. The present inventors repeatedly examined the $Li_2O$—$Al_2O_3$—$SiO_2$ based crystallized glass, but found it difficult to solve the above problems. That is, it was made clear that the β-spoudumene is ordinarily precipitated in the crystallized glass of this type (typically described in Japanese patent application No. 1-174,895), and aggregated particles may be formed through the aggregation of crystals depending upon the kind of an additive in the composition of the starting materials and the heating temperature for the crystallization, and the center line average surface roughness is further increased by such aggregated particles.

For example, JP-A-6-329,440 describes a process for controlling the surface roughness of the $Li_2O$—$Al_2O_3$—$SiO_2$ based crystallized glass. However, the center line average surface roughness cannot be reduced to a level of not more than 10 Å by this process.

The present inventors crystallized a raw glass having the composition of $Li_2O$—$Al_2O_3$—$SiO_2$ which contains 65 to 85 wt % of $SiO_2$, 8 to 15 wt % of $Li_2O$, 2 to 8 wt % of $Al_2O_3$, 1 to 5 wt % of $P_2O_5$ and 1 to 10 wt % of $ZrO_2$ at various temperatures in the state that $ZrO_2$ was contained in the raw glass. The inventors surprisingly discovered that in a given crystallizing temperature range, the aggregation of the secondary particles disappeared and fine crystals were extremely uniformly dispersed among the glass phases. As a result, it was discovered that the center line average surface roughness after the finely polishing the crystallized glass was extremely decreased, and that it could be reduced to Ra of not more than 10 Å. The present inventors reached their invention.

If no $ZrO_2$ is added, an eucryptite phase ($Li_2O.Al_2O_3.2SiO_2$) phase and the spodumene ($Li_2O.Al_2O_3.4SiO_2$) phase are predominant in the crystal. When 0.5 wt % of $ZrO_2$ is added, a still considerable amount of the eucryptite phase and the spodumene phase remained, although slightly decreased, and some aggregated particles remained. When not less than 1.0 wt % of $ZrO_2$ was added, both of the eucryptite phase and the spodumene phase were remarkably reduced, and the aggregation to the secondary aggregates was not observed through a microscope. It was also seen that the main crystalline phase was lithium disilicate ($Li_2O.2SiO_2$). In addition, it was confirmed that since the crystallization proceeded, the crystallized glass had strength large enough to be used as a magnetic disc substrate.

When the intensity of the X-ray diffraction peak of lithium disilicate is taken as 100, the sum of the intensity of the eucryptite phase and that of the spodumene phase is preferably not more than 50, and more preferably not more than 40.

In order to crystallize the glass preform, the maximum temperature in the crystallization step needed to be 680° C. to 700° C. When the maximum temperature was more than 770° C., the eucryptite, etc. were still produced, and the center line average surface roughness (Ra) after the fine polishing increased. From this point, it is more preferable to set the maximum temperature at not more than 760° C. Strength of the crystallized glass was increased by setting the maximum temperature at not less than 680° C. From this point of view, setting at not less than 700° C. is more preferable.

The crystallized glass according to the present invention may contain the $Al_2O_3$ phase, the β-cristobalite phase and $Li_2O.SiO_2$ phase. When the intensity of the X-ray diffraction peak of lithium disilicate is taken as 100, the intensity of the X-ray diffraction peak of the $Al_2O_3$ phase is preferably not more than 50, and the intensity of the X-ray diffraction peak of the β-cristobalite is preferably not more than 50, whereas the intensity of the X-ray diffraction peak of the $LiO_2.SiO_2$ phase is preferably not more than 70. The lower limit of each of these phases is zero. The crystallized glass according to the present invention does not substantially contain α-quartz, that is α-quartz is not detected by X-ray diffraction or its peak is not more than 5. Further, the crystallinity of the crystallized glass is preferably not less than 60%.

In the composition of the glass preform, $SiO_2$ is a fundamental component indispensable for obtaining lithium disilicate. If the content of $SiO_2$ is less than 65 wt %, it is difficult to precipitate the desired crystalline phases, whereas if it is more than 85%, it is difficult to melt glass.

If the $Al_2O_3$ component is more than 8 wt % in the glass preform, the production amount of the eucryptite phase tends to be excessive, so that strength of the magnetic disc substrate decreases and the center line average roughness increases.

As mentioned above, the content of $ZrO_2$ needs to be not less than 1 wt %. If this content is not less than 2 wt %, the center line average surface roughness can be further decreased. If the content of $ZrO_2$ is more than 10 wt %, the melting temperature of glass increases, which makes industrial handling difficult. From this point of view, it is preferable to set the content of $ZrO_2$ at not more than 8 wt %, and more preferable to set it at not more than 4 wt %.

Other component(s) may be contained in the crystallized glass according to the present invention. $TiO_2$, $SnO_2$ and a fluoride of a noble metal such as platinum can be incorporated singly or in a mixed state of two or more kinds of them.

Further, 0 to 7 wt % of $K_2O$ may be incorporated. This functions to lower the melting and shaping temperatures of glass and to prevent devitrification of glass during shaping. In order to exhibit the above functions, the content of $K_2O$ is preferably set at not less than 2 wt %. If this content exceeds 7 wt %, strength of the crystallized glass tends to lower. One or both of $As_2O_3$ and $Sb_2O_3$ may be contained in a total amount of 0 to 2 wt %. They are refining agents. In addition, 0 to 3 wt % of $B_2O_3$ component, 0 to 3 wt % of CaO component, 0 to 3 wt % of SrO and 0 to 3 wt % of BaO may be incorporated.

However, as mentioned above, substantially no MgO component is contained in the crystallized glass. That substantially no MgO component is contained in the crystallized glass means that MgO component originating as inevitable impurity contained in other powdery starting components is not excluded.

The glass preform is produced by mixing starting materials containing the above metal atoms at the above weight ratio and melting the resulting mixture. As such starting materials, oxides, carbonates, nitrates, phosphate, and hydroxides of those metallic atoms may be recited by way of example. Further, as an atmosphere for the crystallization of the glass preform under heating, open air atmosphere, reducing atmosphere, steam atmosphere, pressurizing atmosphere or the like may be selected.

When the glass preform is heated in the above producing process, it is preferable to produce crystal nuclei under condition that the temperature range is at least not less than 500° C. and the heating rate is 50 to 300° C./hour. Moreover, it is preferable to produce the crystal nuclei by holding the glass at least in a temperature range of 500° C. to 580° C. for 1 to 4 hours.

In order to finely polish a member made of the above crystallized glass with grinding grains, a magnetic disc substrate may be produced by a known fine polishing such as lapping or polishing. In addition, an under treating layer, a magnetic film, a protective film or the like may be formed on a main plane of the magnetic disc substrate according to the present invention, and further a lubricant may be coated upon the protective layer.

Besides the reading/writing zone, a landing zone may be provided at the magnetic disc substrate made of the crystallized glass according to the present invention. The center line average surface roughness (Ra) of the reading/writing zone is preferably 5 to 10 Å, whereas the maximum height of the reading/writing zone is not more 100 Å.

Next, the present inventors contrived that when a magnetic disc substrate body was to be produced from the crystallized glass according to the second aspect, a metallic element absorbing light was incorporated into at least a surface portion of the magnetic disc substrate body and a texture was formed by irradiating high energy light upon its surface, and the inventors actually made experiments. Consequently, the inventors discovered that a texture having a controlled height could be formed on an extremely flat and smooth surface finely polished with the center line average surface roughness of not more than 10 Å.

The process for incorporating the metallic element absorbing light in at least the surface portion of the magnetic disc substrate body may be the same as the two processes as explained in connection with the first aspect of the present invention mentioned above. In particular, the above metallic element was favorably incorporated into the crystallized glass in the form of an oxide.

The present inventors proceeded with investigations, and discovered that if the above oxide is other than chromium oxide, a texture having an appropriate height can be formed at high productivity by setting the total addition amount of the oxide(s) at not less than 0.01 parts by weight. Further, it was seen that as the addition amount of the oxide(s) was increased, the intensity of the peak of $\beta$-eucryptite phase tended to increase. If this intensity is increased beyond a certain level, it becomes difficult to form a flat and smooth surface having the center line average surface roughness of not more than 10 Å after the fine polishing. From this point of view, when the total addition amount of the oxide(s) is not more than 3 parts by weight, particularly the production of the $\beta$-eucryptite phase can be suppressed, and the textures can be mass-produced while realizing the flat and smooth polished surfaces.

For example, when iron oxide, manganese oxide and/or cobalt oxide were added, the intensity of the peak ($2\theta=26.1°$) of the $\beta$-eucryptite phase was not less than 50 when the intensity of the peak ($2\theta=24.8°$) of lithium disilicate was taken as 100, if the total or single addition amount of these oxide exceeded 3 parts by weight. Consequently, the center line average surface roughness could not be suppressed to not more than 10 Å.

However, if chromium oxide among the above oxides is added, it functions to suppress the production of the $\beta$-eucryptite phase. Therefore, if at least chromium oxide is included in the additives, the addition amount of chromium oxide is preferably not less than 0.01 parts by weight but not more than 10 parts by weight. In particular, if chromium oxide is used together with an oxide other than chromium oxide, it is preferable that the addition amount of chromium oxide is not less than 0.5 parts by weight but not more than 10 parts by weight and the total addition amount is not less than 3 parts by weight but not more than 10 parts by weight.

As the metal capable of absorbing light and to be incorporated into the magnetic disc substrate body according to the present invention, transition metal elements are preferred.

BRIEF DESCRIPTION OF THE DRAWINGS

FIG. 1(a) is a plane view showing an embodiment of a magnetic disc substrate 1;

FIG. 1(b) is a plane view showing an embodiment of a magnetic disc 10;

FIG. 2(a) is a plane view schematically showing a plane shape of a texture formed on a landing zone 3;

FIG. 2(b) is a partially enlarged view of FIG. 2(a);

FIG. 3 is a graph showing the relationship between a time period for immersing a magnetic disc substrate into a molten salt of $AgNO_3$ and the height of protuberances formed by irradiation of laser beam;

DETAILED DESCRIPTION OF THE INVENTION

Figure 4:
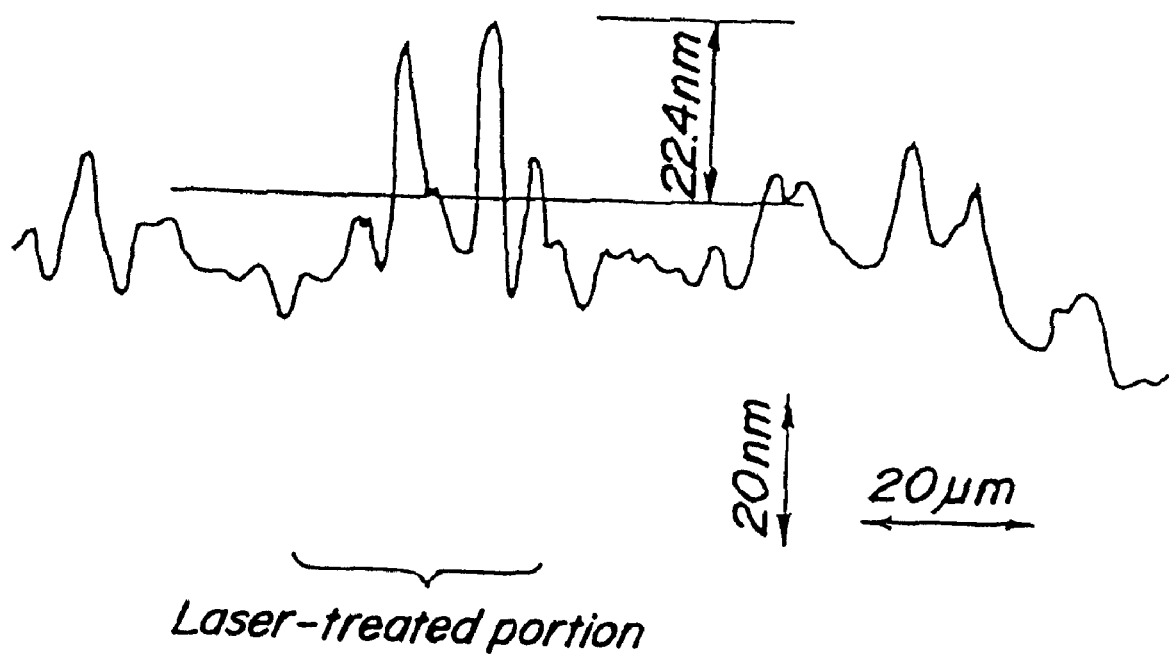
FIG. 4 is a graph showing results obtained by measurement of the sectional shapes of protuberances produced by laser processing with a surface roughness meter.

As shown in FIG. 1(a), a reading/writing zone 2 and a landing zone 3 may be separately provided on a substrate 1 for a magnetic disc according to the present invention. The height (Rp) of the flatness of the landing zone 3 is preferably in a range of 50 to 200 Å. Furthermore, it is preferable that a spacer-laminating section 4 is provided inside the landing zone 3, and that the center line average surface roughness of the spacer-laminating section 4 is not more than 3 nm. A round hole 5 is formed inside the spacer-laminating section 4.

In the magnetic disc substrate according to the present invention, at least a magnetic film needs to be formed on a main face of the above substrate. Preferably, as shown in FIG. 1(b), a magnetic disc 10 may be produced by forming an undertreating layer 6, a magnetic film 7, a protective film 8 and a lubricating film 9 successively on the surface of the magnetic disc substrate 1.

In the following, specific experimental results will be explained.

EXAMPLE 1

Production of a glass preform for a magnetic disc substrate

Powdery compounds containing respective metals were mixed to give 76.5 wt % of $SiO_2$, 7.1 wt % of $Al_2O_3$, 11.4 wt % of $Li_2O$, 2.9 wt % of $K_2O$, 1.9 wt % of $P_2O_5$ and 0.2 wt % of $Sb_2O_3$. The mixture was melted by heating at 1350° C. for 20 hours. The melt was shaped, and a glass preform having a circular shape was obtained by gradual cooling.

Production of a magnetic disc substrate

The resulting glass preform was heated at a heating rate of 50° C./h in atmosphere, and thermally treated at 850° C. in the atmosphere for 4 hours. Then, the glass was cooled down to room temperature at a cooling rate of 50° C./h, thereby obtaining a substrate material made of a crystallized glass. This substrate material had a round discoidal shape of 65 mm in an outer diameter and 20 mm in an inner diameter.

Crystalline phases of this substrate material were identified, and the weight ratio of the crystalline phases was determined by measurement. This determination was effected by a X-ray diffraction. As a result, the percentage of lithium disilicate was 48 wt %, and that of the β-spodumene phase 19 wt %.

Opposite main surfaces of the substrate material were polished flat in a thickness of 0.75 mm and a flatness of 8 μm by using a diamond grinding stone. Then, a finely polished body having a thickness of 0.64 mm was obtained by lapping the opposed polished main surfaces of the substrate material with GC grinding grains. Thereafter, the resulting substrate material was finish polished to a thickness of 0.635 mm by using grinding grains of cerium oxide. The resulting substrate material had the center line average surface roughness of 20 Å and a flatness of not more than 5 μm.

Introduction of silver ions into a surface portion of the magnetic disc substrate The above magnetic disc substrate was immersed in isopropyl alcohol at 25° C. for 4 minutes, and washed. Then, the magnetic disc substrate was immersed into a melted 97% $AgNO_3$ liquid (temperature: 250° C.), thereby incorporating the silver ions into the surface portion of the magnetic disc substrate.

Formation of a texture in the substrate body by irradiating laser beam

A YAG laser beam (wavelength 1.06 μm, output 50 W) was irradiated upon the surface of the magnetic disc substrate under rotation. The rotating speed of the magnetic disc substrate was 60 mm/sec. Thereby, a number of protuberances having a planar shape as shown in FIGS. 2(a) and 2(b) were formed. More specifically, a number of the slender protuberances 11 were circumferentially formed in the landing zone 3 such that the protuberances 11 were arranged in plural stages as viewed in a radial direction. The surface state of the protuberances was measured by a surface roughness meter.

The relationship between the height of the protuberances and the time period during which the magnetic disc substrate was immersed into the melt is shown in FIG. 3. Further, the sectional shapes of the protruberances formed on the magnetic disc substrate when the immersion time period was set at 60 seconds were measured by the surface roughness meter, and results are shown in FIG. 4.

As is seen from the above results, it was clarified that when the magnetic disc substrate was immersed into the melt at 250° C. for 30 to 60 seconds, the protuberances having heights of 100 to 200 Å could be formed under the above laser beam-irradiating condition.

EXAMPLE 2

As in Example 1, opposite surfaces of a magnetic disc substrate were finish polished, and then the substrate was immersed in a 97% $AgNO_3$ melt held at 250° C. for 45 seconds, thereby introducing Ag ions into a surface portion of the magnetic disc substrate. A laser beam was irradiated upon a landing zone of the magnetic disc substrate under the above laser-irradiating condition according to a pattern shown in FIGS. 2(a) and 2(b). As a result, protuberances were formed at the laser beam-irradiated portion of the substrate at the average height of 170 Å.

In FIG. 2(b), the protuberances had the average radial width "c" of 0.05 mm and the circumferential length "a" of 0.065 mm. The pitch "b" between the circumferentially adjacent protuberances 11 was 0.8 mm, and the pitch "d" between the radially adjacent protuberances is 0.2 mm. The time period required for the formation of the protuberances was only 10 seconds per one magnetic disc substrate 1.

As shown in FIG. 1(b), various layers were formed on the magnetic disc substrate body as shown in FIG. 1(b), thereby producing a magnetic disc 10 for CSS (contact-start stopping) testing. That is, a 150 nm thick sputtered film of chromium was formed as a under layer 6 on the surface of the magnetic disc substrate 1, and a Co—Ta—Cr magnetic film 7 was formed in a thickness of 60 nm on the surface of the under layer 6. Then, a protective film 8 made of a carbon film was formed in a thickness of 30 nm by sputtering. Then, a lubricant layer 9 was formed on the surface of the protective layer 8 by coating.

When the magnetic disc 10 was subjected to the CSS testing, a 50% size thin film magnetic head was used as a magnetic head slider, and the CSS testing was effected in the landing zone at the number of revolutions of 4500 rpm under a gram load of 3.5 g. The result was good in that the coefficient of friction between the magnetic head and the magnetic disc was 0.3 even after 50,000 times CSS testing.

EXAMPLE 3

Samples were produced according to Experimental Nos. shown in Table 2 similarly as in Example 1.

Production of a glass preform for a magnetic disc substrate

Powdery compounds containing respective metals were mixed to give 76.5 wt % of $SiO_2$, 7.1 wt % of $Al_2O_3$, 11.4 wt % of $Li_2O$, 2.9 wt % of $K_2O$, 1.9 wt % of $P_2O_5$ and 0.2 wt % of $Sb_2O_3$. At that time, an additive was incorporated into the mixed powder in a given part by weight relative to 100 parts by weight of the latter as shown in Table 2. In Experimental No. 3-3, no metal oxide additive was incorporated. The resulting mixture was charged into a platinum crucible, and melted by heating it at 1450° C. for 15 hours. The melt was poured into a mold, and gradually cooled. A glass preform having a round planar shape was obtained by cutting the molding.

Production of a magnetic disc substrate

The resulting glass preform was heated at a heating rate of 50° C./h in atmosphere, and thermally treated at 850° C. in the atmosphere for 6 hours. Then, the glass was cooled down to room temperature at a cooling rate of 50° C./h, thereby obtaining a substrate material made of a crystallized glass. This substrate material had a round discoidal shape of 65 mm in an outer diameter and 20 mm in an inner diameter.

Crystalline phases of this substrate material were identified, and the weight ratio of the crystalline phases was determined by measurement. This determination was effected based on a X-ray diffraction. As a result, the percentage of the lithium disilicate was 48 wt %, and that of the β-spodumene phase 19 wt %.

Opposite main surfaces of the substrate material were polished flat in a thickness of 0.75 mm and a flatness of 8 μm by using a diamond grinding stone. Then, a finely polished body having a thickness of 0.64 mm was obtained by lapping the opposed polished main surfaces of the substrate material with GC grinding grains. Thereafter, the resulting substrate material was finish polished to a thickness of 0.635 mm by using grinding grains of cerium oxide. The resulting substrate material had the center line average surface roughness Ra of 10 Å and a flatness of not more than 5 μm.

Formation of a texture by irradiating laser beam

A YAG laser beam was irradiated upon the surface of the magnetic disc substrate under rotation. The rotating speed of the magnetic disc substrate was 60 mm/sec. Thereby, a number of protuberances having a planar shape as shown in FIGS. 2(a) and 2(b) were formed. More specifically, a number of the slender protuberances 11 were circumferentially formed in the landing zone 3 such that the protuberances 11 were arranged in plural stages as viewed in a radial direction. The height and the surface state of the protuberances were measured by the surface roughness meter.

TABLE 2

| Experimental No. | Wavelength of laser beam (nm) | Additive | Addition ratio (parts by weight) | Height of protuberances (Å) |
|---|---|---|---|---|
| 3-1 | 1064 | NiO | 3.0 | 150 |
| 3-2 | 1064 | CuO | 3.0 | 180 |
| 3-3 | 533 | none | — | 0 |
| 3-4 | 533 | $MnO_2$ | 0.005 | 20 |
| 3-5 | 533 | $MnO_2$ | 0.01 | 50 |
| 3-6 | 533 | $MnO_2$ | 2.0 | 150 |
| 3-7 | 533 | $MnO_2$ | 3.0 | 200 |
| 3-8 | 533 | $MnO_2$ | 5.0 | 800 |

In Experimental Nos. 3-1 and 3-2 falling in the scope of the present invention, the laser beam having a wavelength of 1064 nm was used, and 3.0 parts by weight of NiO or CuO was incorporated. As a result, protuberances each having a preferred pointed shape of 150 Å or 180 Å could be formed. In Experimental No. 3-3 falling outside the scope of the invention, no protuberances could be formed. In Experimental Nos. 3-4 to 3-8, $MnO_2$ was incorporated into the substrate body, while its addition amount was varied in various ways. As a result, protuberances could be formed in these experimental samples. However, since the preferred height of the protuberances in the texture is ordinarily 50 to 200 nm, the addition amount of $MnO_2$ is preferably 0.01 to 3.0 parts by weight.

EXAMPLE 4

Samples were produced according to Experimental Nos. in Table 3 similarly as in Example 3, provided that the kind and the addition amount of the metal compound were varied as shown in Table 3.

TABLE 3

| Experimental No. | Wavelength of laser beam (nm) | Additive | Addition ratio (parts by weight) | Height of protuberances (Å) |
|---|---|---|---|---|
| 4-1 | 533 | CoO | 1.0 | 60 |
| 4-2 | 533 | $Nd_2O_3$ | 2.0 | 100 |
| 4-3 | 266 | $TiO_2$ | 1.0 | 80 |
| 4-4 | 266 | $V_2O_5$ | 1.0 | 170 |
| 4-5 | 266 | $K_2Cr_2O_7$ | 1.0 | 160 |
| 4-6 | 266 | $Fe_2O_3$ | 1.0 | 120 |
| 4-7 | 266 | $CeO_2$ | 1.0 | 180 |

In Experimental Nos. 4-1 and 4-2 falling in the scope of the present invention, a laser beam having a wavelength of 533 nm was used, and 1.0 parts by weight of CoO or 2.0 parts by weight of $Nd_2O_3$ was incorporated. As a result, protuberances having a preferred pointed shape of 60 Å or 100 Å could be formed. In Experimental Nos. 4-3 to 3-7, a laser beam having a wavelength of 266 nm was used, and 1.0 parts by weight of $TiO_2$, $V_2O_5$, $K_2Cr_2O_7$, $Fe_2O_3$ or $CeO_2$ was incorporated into the substrate. As a result, protuberances having heights from 80 to 170 Å and preferred pointed tips could be formed in these Experimental samples.

EXAMPLE 5

Samples were produced according to Experimental Nos. in Table 4 similarly as in Example 3, provided that the kind and the addition amount of the metal compounds were varied as shown in Table 4. In each Experimental sample, three kinds of the metal oxides were added.

TABLE 4

| Experimental No. | Wavelength of laser beam (nm) | Additive & addition ratio (parts by weight) | Height of protuberances (Å) |
|---|---|---|---|
| 5-1 | 1064 | $MnO_2$: 1.51, CoO: 0.13 $K_2Cr_2O_7$: 1.88 | 50 |
| 5-2 | 533 | $MnO_2$: 1.51, CoO: 0.13 $K_2Cr_2O_7$: 1.88 | 200 |
| 5-3 | 266 | $MnO_2$: 1.51, CoO: 0.13 $K_2Cr_2O_7$: 1.88 | 160 |
| 5-4 | 533 | CoO: 0.05, $TiO_2$: 0.50 $Fe_2O_3$: 0.70 | 50 |
| 5-5 | 533 | $MnO_2$: 0.54, CoO: 0.05 $Fe_2O_3$: 0.70 | 110 |

In Experimental Nos. 5-1 and 5-3 falling in the scope of the present invention, $MnO_2$, CoO, and $K_2Cr_2O_7$ were incorporated, and the wavelength of the laser beam was varied among 1064 nm, 533 nm and 266 nm, respectively. As a result, protuberances each having a preferred pointed shape of 50 Å or 200 Å could be formed in each case, respectively.

In Test Run Nos. 5-4 and 5-5, $CoO_2$, $Fe_2O_3$, and $TiO_2$ or $MnO_2$ were incorporated into the substrate body, and a laser beam having a wavelength of 533 nm was used. As a result, protuberances having heights of 50 and 110 Å, respectively and preferred pointed tips could be formed in these Test Runs.

In the following, experimental results regarding the second aspect of the present invention will be described.

A raw material of each composition was prepared to give a ratio in oxides shown in Table 5. The ratio shown in Table 5 means weight percentages of metal oxides in a glass preform.

Producing examples from Composition C

Compounds containing respective metals were mixed to give a weight ratio of oxides shown in Composition C of Table 5, and the resulting mixture was melted by heating at 1400° C. The melt was molded, and gradually cooled, thereby obtaining a glass preform. Crystal nuclei were formed by holding the resulting glass preform at 520° C. in an nitrogen atmosphere for one hour. The glass was heated at a heating rate of 100° C./hour, and held at a given crystallizing temperature for 4 hours, followed by cooling it to room temperature. Thereby, a crystallized glass was obtained.

Figure 5:
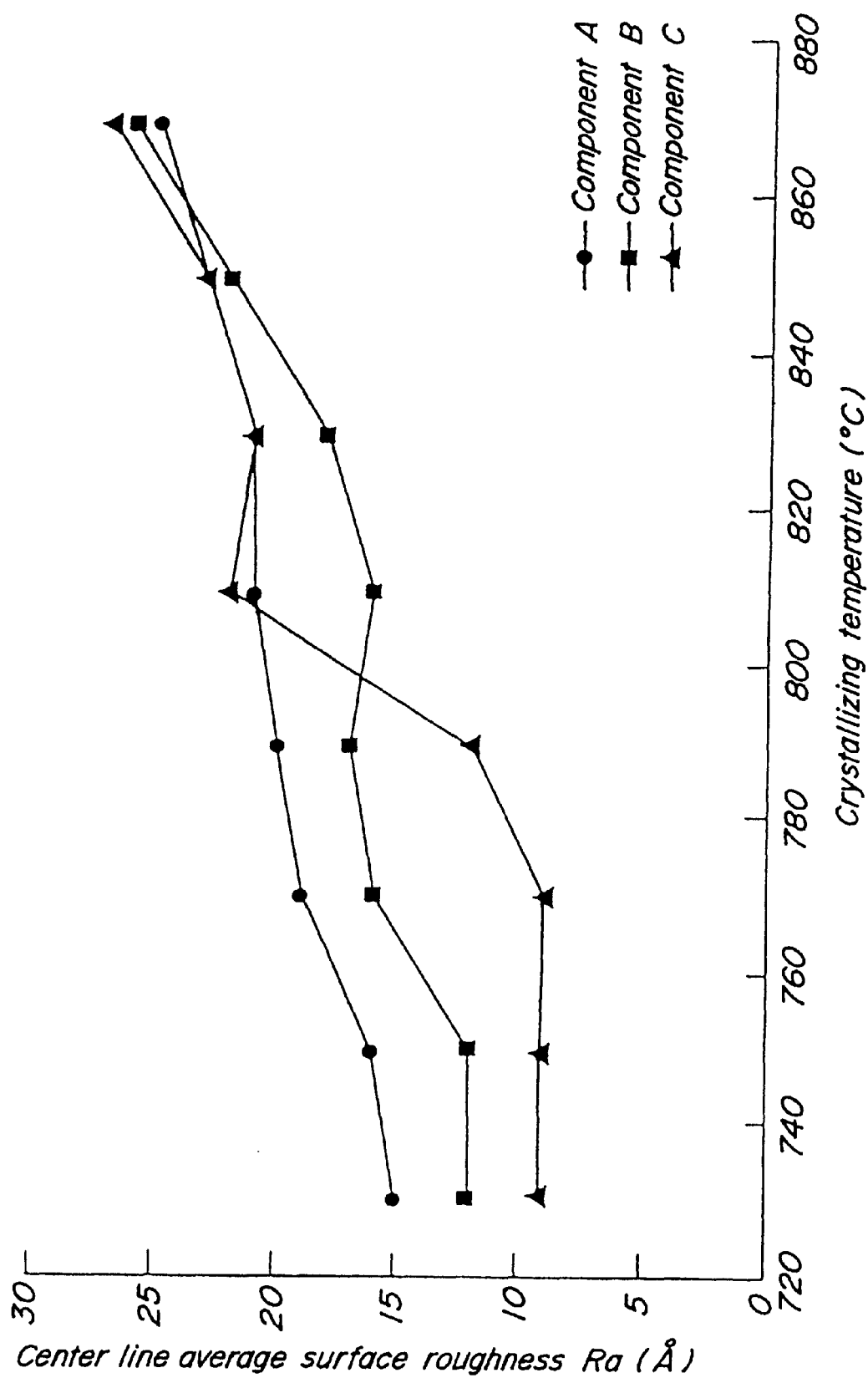
FIG. 5 is a graph showing the relationship between the center line average surface roughness (Ra) and the crystallizing temperature in the crystallized glasses having different compositions in the case of the second aspect of the present invention.
Figure 6:
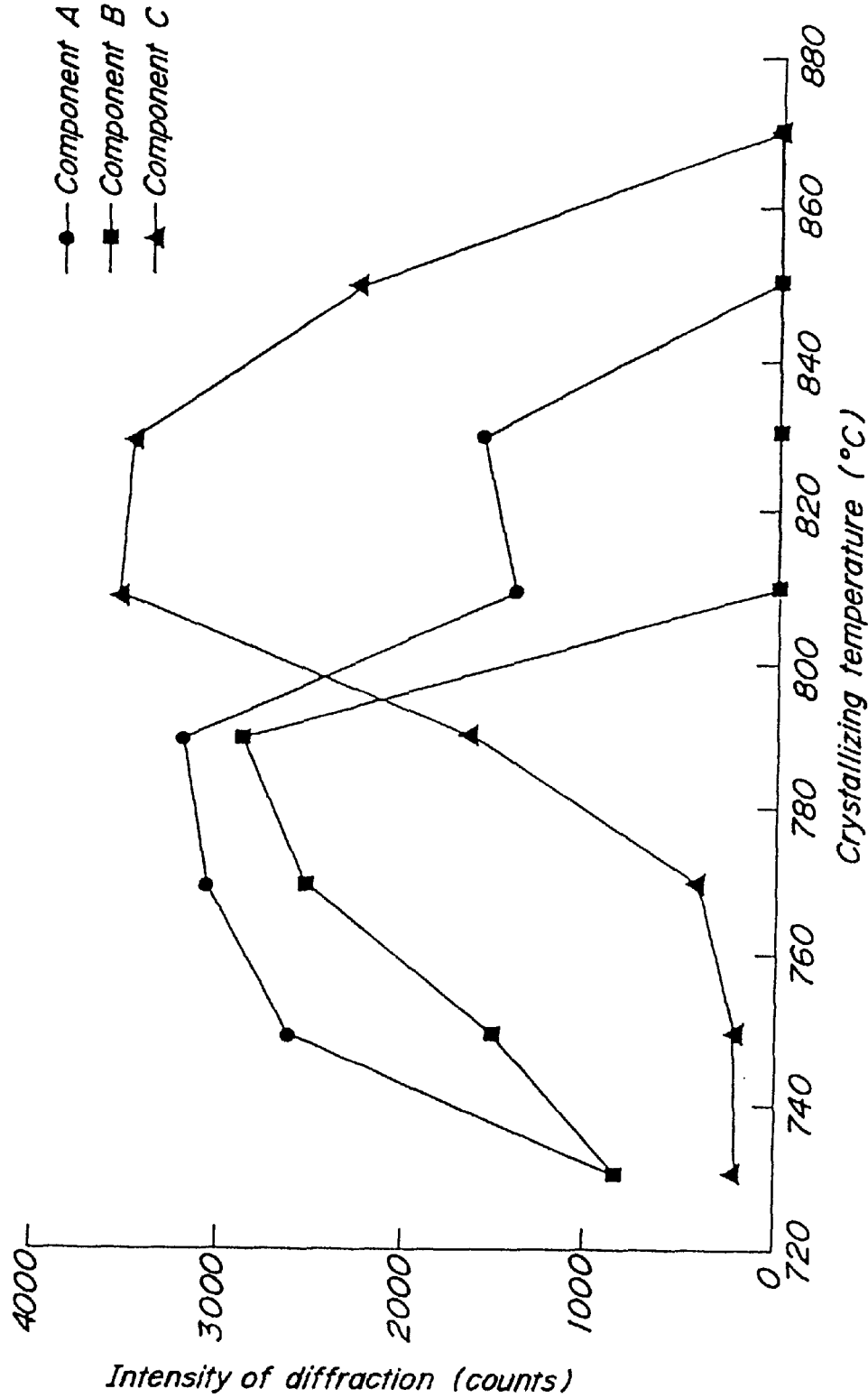
FIG. 6 is a graph showing the relationship between the diffraction intensity of the eucryptite phase and the crystallizing temperature for crystallized glasses having different compositions.

An experimental sample, 15 mm long, 15 mm wide and 0.8 mm thick, was cut out from each crystallized glass, and opposite surfaces of this experimental sample were finish polished by using cerium oxide grinding particles having the average particle diameter of 1.5 μm on an opposite-face polishing table bonded with polyurethane pads. The center line average surface roughness (Ra) of the finish polished surfaces was measured by using a surface roughness meter attached with a touching needle having a diameter of 0.5 μm. Measurement results are shown in Table 6. Crystalline phases in the crystallized glass were identified by the X-ray diffraction method, and the intensity of the peak of each crystalline phase was measured. A relative ratio of the intensity of the peak of each crystalline phase is shown in Table 6, while the intensity of the peak of lithium disilicate ($Li_2O.2SiO_2$) is taken as 100. The relationship between the center line average surface roughness (Ra) and the crystallizing temperature is shown in FIG. 5, and the relationship between the intensity (absolute value) of diffraction of the eucryptite phase and the crystallizing temperature is shown in FIG. 6.

TABLE 5

| Ingredients | Composition A | Composition B | Composition C | Composition D | Composition E | Composition F |
|---|---|---|---|---|---|---|
| $SiO_2$ | 76.1 | 75.7 | 74.6 | 76.0 | 76.0 | 71.0 |
| $Li_2O$ | 11.8 | 11.7 | 11.6 | 10.0 | 10.0 | 10.0 |
| $Al_2O_3$ | 7.1 | 7.1 | 7.0 | 7.0 | 7.0 | 6.0 |
| $K_2O$ | 2.8 | 2.8 | 2.7 | 2.8 | 2.7 | 6.0 |
| $ZrO_2$ | 0.0 | 0.5 | 2.0 | 2.0 | 2.0 | 1.0 |
| $P_2O_5$ | 2.0 | 2.0 | 2.0 | 2.0 | 2.0 | 2.0 |
| $Sb_2O_3$ | 0.2 | 0.2 | 0.2 | 0.2 | 0.2 | 0.5 |
| $Fe_2O_3$ | 0.0 | 0.0 | 0.0 | 0.0 | 0.1 | 0.0 |
| MgO | 0.0 | 0.0 | 0.0 | 0.0 | 0.0 | 3.5 |

TABLE 6

Composition C

| Crystal-lizing temperature (° C.) | Ra (A) | Li$_2$O.AL$_2$O$_3$. 2SiO$_2$. | Li$_2$O.Al$_2$O$_3$. 4SiO$_2$ | Al$_2$O$_3$ | β-cristo-balite | Li$_2$O.SiO$_2$ |
|---|---|---|---|---|---|---|
| 870 | 27 | 0 | 67 | 0 | 0 | 0 |
| 850 | 23 | 65 | 0 | 0 | 0 | 0 |
| 830 | 21 | 95 | 0 | 0 | 0 | 0 |
| 810 | 22 | 98 | 0 | 0 | 0 | 0 |
| 790 | 13 | 51 | 0 | 0 | 0 | 0 |
| 770 | 9 | 13 | 0 | 12 | 0 | 0 |
| 750 | 9 | 7 | 0 | 13 | 0 | 0 |
| 730 | 9 | 20 | 0 | 28 | 30 | 50 |

Producing examples of Composition A

Each experimental sample was produced in the same manner as above, and Ra and the relative ratio in the intensity of the peak of the respective crystalline phases were measured with respect to the each experimental sample. Results are shown in Table 7. The relationship between the center line average surface roughness (Ra) and the crystallizing temperature is shown in FIG. 5, and the relationship between the intensity of diffraction of the eucryptite phase and the crystallizing temperature is shown in FIG. 6.

Producing examples of Composition B

Each experimental sample was produced in the same manner as above, and Ra and the relative ratio in the intensity of the peak of the respective crystalline phases were measured with respect to the each experimental sample. Results are shown in Table 8. The relationship between the center line average surface roughness (Ra) and the crystallizing temperature is shown in FIG. 5, and the relationship between the intensity of diffraction of the eucryptite phase and the crystallizing temperature is shown in FIG. 6.

TABLE 7

Composition A

| Crystal-lizing temperature (° C.) | Ra (A) | Li$_2$O.AL$_2$O$_3$. 2SiO$_2$. | Li$_2$O.Al$_2$O$_3$. 4SiO$_2$ | Al$_2$O$_3$ | β-cristo-balite | Li$_2$O.SiO$_2$ |
|---|---|---|---|---|---|---|
| 870 | 25 | 0 | 55 | 0 | 0 | 0 |
| 850 | 23 | 0 | 56 | 0 | 0 | 0 |
| 830 | 21 | 41 | 39 | 0 | 0 | 0 |
| 810 | 21 | 34 | 40 | 0 | 0 | 0 |
| 790 | 20 | 82 | 0 | 0 | 0 | 0 |
| 770 | 19 | 83 | 0 | 0 | 0 | 0 |
| 750 | 16 | 79 | 0 | 0 | 0 | 8 |
| 730 | 15 | 58 | 0 | 0 | 59 | 67 |
| 700 | 10 | 35 | 0 | 0 | 40 | 85 |

TABLE 8

Composition B

| Crystal-lizing temperature (° C.) | Ra (A) | Li$_2$O.AL$_2$O$_3$. 2SiO$_2$. | Li$_2$O.Al$_2$O$_3$. 4SiO$_2$ | Al$_2$O$_3$ | β-cristo-balite | Li$_2$O.SiO$_2$ |
|---|---|---|---|---|---|---|
| 870 | 26 | 0 | 62 | 0 | 0 | 0 |
| 850 | 22 | 0 | 60 | 0 | 0 | 0 |
| 830 | 18 | 0 | 56 | 0 | 0 | 0 |
| 810 | 16 | 0 | 53 | 0 | 0 | 0 |
| 790 | 17 | 77 | 0 | 0 | 0 | 0 |
| 770 | 16 | 69 | 0 | 0 | 0 | 0 |
| 750 | 12 | 51 | 0 | 0 | 0 | 0 |
| 730 | 12 | 48 | 0 | 0 | 25 | 48 |

Producing examples of Compositions D and E

Each experimental sample was produced in the same manner as above, and Ra and the relative ratio in the intensity of the peak of the respective crystalline phases were measured with respect to the each experimental sample. Results are shown in Table 9.

Producing examples using Composition F and evaluations

As mentioned above, an experimental sample made of a crystallized glass was produced by using a raw material of Composition F, and the center line average surface roughness and crystalline phases were measured. In this composition, $SiO_2$ was reduced to 71.0 wt %, and 3.5 wt %

TABLE 9

| Composition | Crystallizing temperature (° C.) | Ra (Å) | $Li_2O\cdot Al_2O_3\cdot 2SiO_2$ | $Li_2O\cdot Al_2O_3\cdot 4SiO_2$ | $Al_2O_3$ | β-cristobalite | $Li_2O\cdot SiO_2$ |
|---|---|---|---|---|---|---|---|
| D | 790 | 27 | 234 | 0 | 0 | 0 | 0 |
| D | 770 | 10 | 48 | 0 | 15 | 16 | 0 |
| D | 750 | 9 | 22 | 0 | 22 | 20 | 0 |
| D | 730 | 7 | 14 | 0 | 19 | 0 | 24 |
| E | 790 | 28 | 203 | 0 | 0 | 0 | 0 |
| E | 770 | 9 | 40 | 0 | 17 | 0 | 0 |
| E | 750 | 8 | 14 | 0 | 20 | 0 | 0 |
| E | 730 | 7 | 0 | 0 | 18 | 0 | 0 |

Evaluation of crystallized glasses using Compositions A, B, C, D and E

No $ZrO_2$ is added in Composition A. In this case, although the center line average surface roughness is gradually decreased by lowering the crystallizing temperature, it is about 15 Å even at the crystallizing temperature of 730° C. The intensity of diffraction of the eucryptite phase is large.

In Composition B, 0.5 wt % of $ZrO_2$ is added. However, no conspicuous differences are observed with respect to the center line average surface roughness and the crystalline phases such as eucryptite phase as compared with the cases using Composition A.

On the other hand, in Composition C using a raw material in which 2.0 wt % of $ZrO_2$ was added, the center line average surface roughness near the crystallizing temperature of 770° C. conspicuously decreased, and consequently the center line average surface roughness of not more than 10 Å was obtained. In addition, reduction in strength of the crystallizing glass was not seen.

Further, when the relationship between the crystallizing temperature and the crystalline phases is observed, as is clear particularly from FIG. 6, the crystallizing temperature at which the eucryptite phase is produced is shifted to a far higher temperature side in the use of Composition C as compared with a case that no $ZrO_2$ is added. As a result, the temperature at which the spodumene phase is produced further rises. It is seen that the production amount of the eucryptite phase conspicuously decreases when the crystallizing temperature lowers from about 790° C. to about 770° C., and simultaneously the lithium silicate phase increases and the $Al_2O_3$ phase comes to be produced. From these results, it is seen that the center line average surface roughness after the fine polishing conspicuously lowers with respect to the crystallized glass in which the relative ratio of the eucryptite phase is not more than 50.

In Composition D, $SiO_2$ is slightly increased and $Li_2O$ is slightly decreased as compared with Composition C, but similar results are obtained. In Composition E, 0.1 wt % of $Fe_2O_3$ was further added and $K_2O$ was decreased by 0.1 wt % as compared with Composition D, but similar results are obtained.

of MgO was added instead. When the crystallization was effected at 750° C., neither eucryptite phase nor spodumene phase were observed from a X-ray diffraction pattern, but an α-quartz phase was observed therein. The center line average surface roughness after the polishing was 18 Å.

The observation of the fine polished surface through an electron microscope revealed secondary particles of α-quartz at the polished surface. Since the aggregated secondary particles have higher hardness than the other crystalline phases and the grain boundary, it was difficult to obtain a higher flatness.

Observation with the electron microscope

Figure 7:
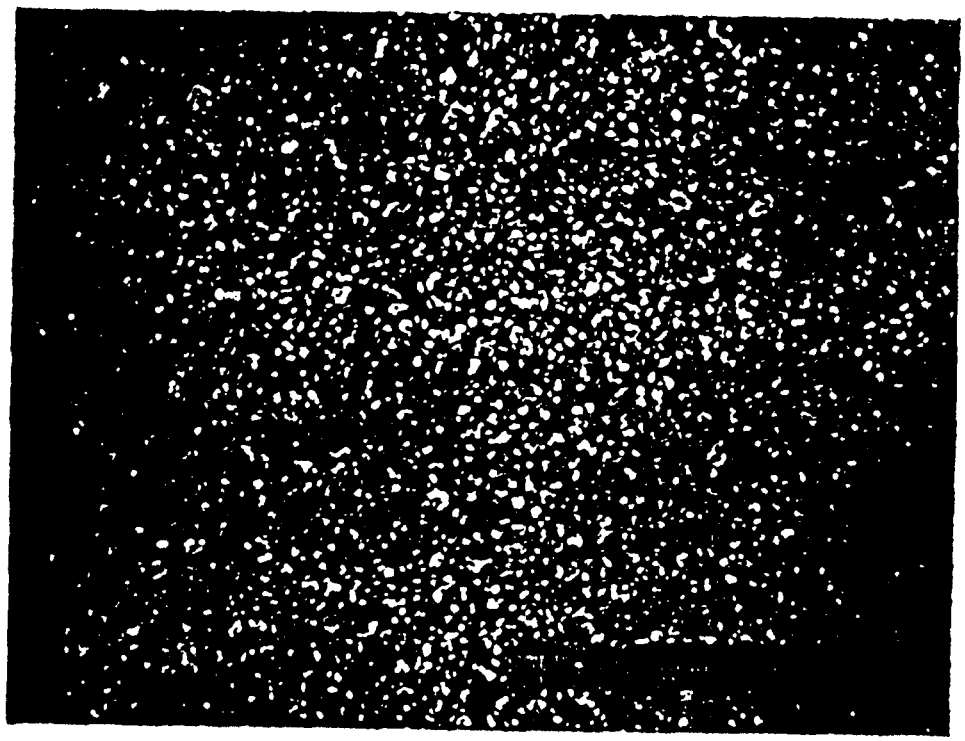
FIG. 7 is a scanning type electron electronic microscope photograph showing a ceramic tissue of a finely polished surface obtained by polishing a crystallized glass which was produced by using a raw material of a composition C and setting a crystallizing temperature at 750° C.

Each experimental sample mentioned above was polished, and then etched in a 5 wt % solution of hydrofluoric acid for one minute. The etched surface was observed with the electron microscope. With respect to experimental samples, an experimental sample using Composition C and treated at a crystallizing temperature of 750° C. is shown in FIG. 7, and one using Composition C and treated at a crystallizing temperature of 790° C. is shown in FIG. 8, whereas FIG. 9 shows an experimental sample using Composition A and treated at 750° C., and FIG. 10 shows one using Composition F and treated at a crystallizing temperature of 750° C.

Figure 8:
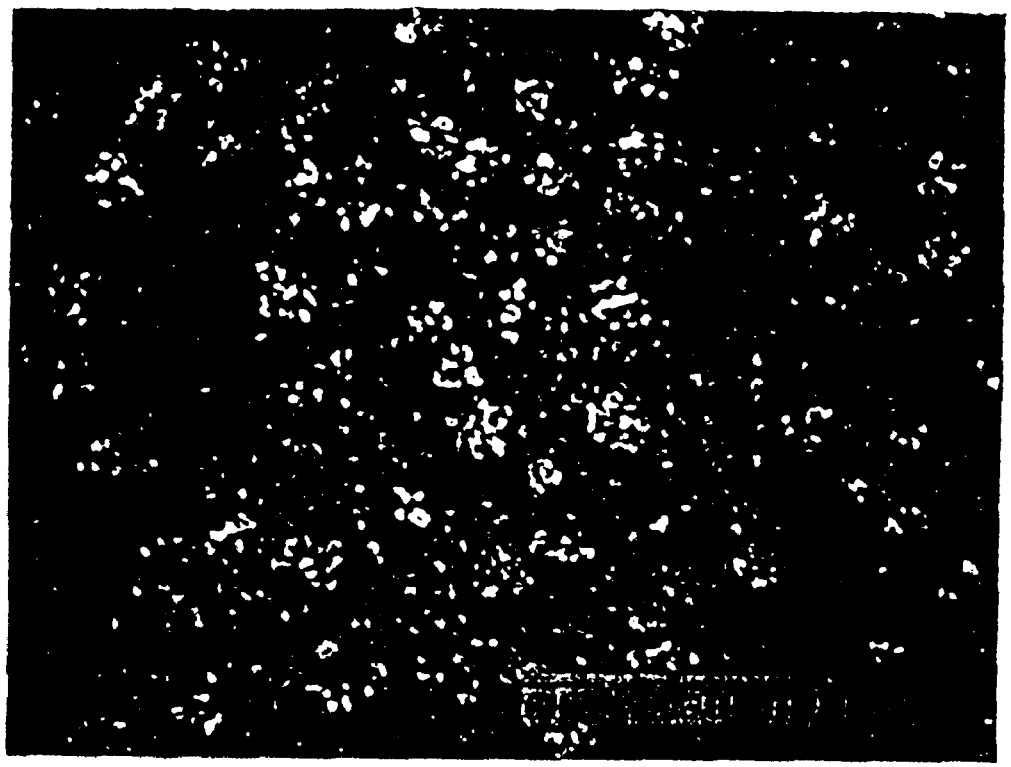
FIG. 8 is a scanning type electron electronic microscope photograph showing a ceramic tissue of a finely polished surface obtained by polishing a crystallized glass which was produced by using a raw material of the composition C and setting a crystallizing temperature at 790° C.

As is seen from FIG. 8, when the crystallizing temperature was 790° C., the secondary particles or the aggregated particles were produced due to the growth of the eucryptite phase, and it became difficult to improve the center line average surface roughness owing to difference in hardness between the secondary particles and the lithium disilicate phase. To the contrary, as is seen from FIG. 7, as the eucryptite phase decreases, the above secondary particles disappear. As is seen from FIG. 6, a very small amount of the eucryptite phase still remains even in this state, but since such an eucryptite phase is not grown, it is considered that the phase does not influence the surface roughness. The above phenomenon could be clearly read from other scanning type electron microscope photographs not shown.

Figure 9:
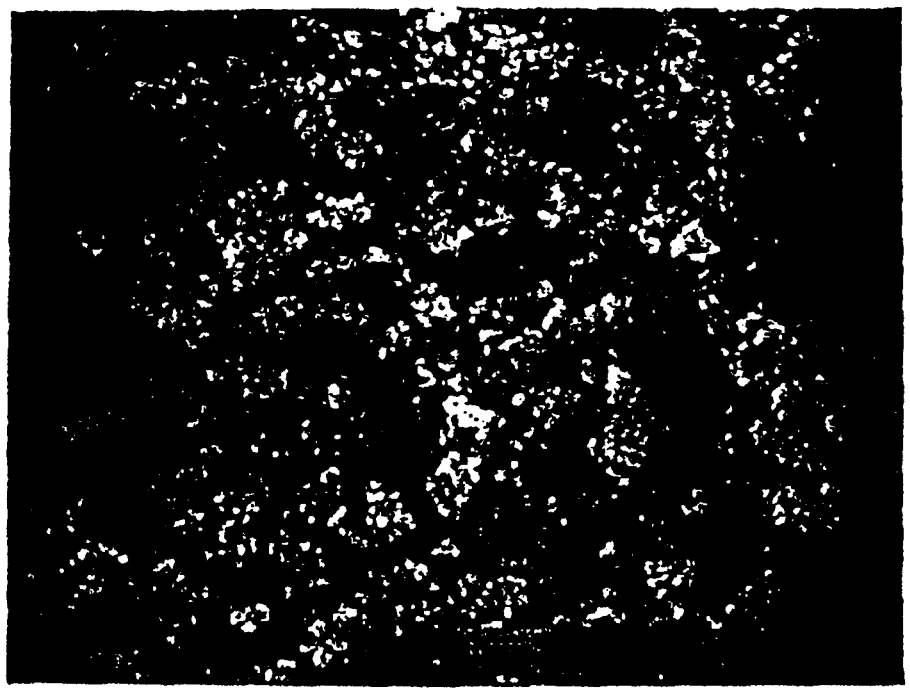
FIG. 9 is a scanning type electron electronic microscope photograph showing a ceramic tissue of a finely polished surface obtained by polishing a crystallized glass which was produced by using a raw material of a composition A and setting a crystallizing temperature at 750° C.
Figure 10:
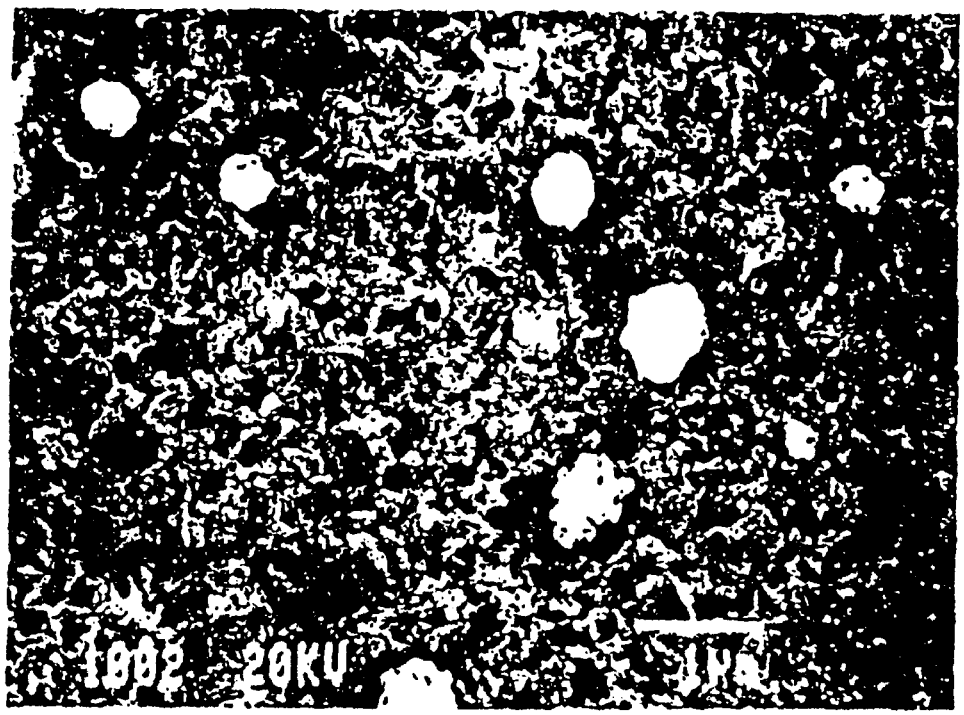
FIG. 10 is a scanning type electron electronic microscope photograph showing a ceramic tissue of a finely polished surface obtained by polishing a crystallized glass which was produced by using a raw material of a composition F and setting a crystallizing temperature at 750° C.

In FIGS. 9 and 10, the production of the secondary particles made of the eucryptite phase or the α-quartz phase is also seen.

Measurement results of strength

An experimental sample having a dimension of 4×40×3 mm was cut out from a crystallized glass using a raw material of Composition C and treated at a crystallizing temperature of 730° C., and its four point bending strength was measured at room temperature according to JIS R1601. As a result, the bending strength was 240 MPa. Further, an experimental sample having a dimension of 4×40×3 mm was cut out from a crystallized glass using a raw material of Composition A and treated at a crystallizing temperature of 730° C., and its four point bending strength was measured at room temperature according to JIS R1601. As a result, the bending strength was 220 MPa.

Further, four point bending strength of a crystallized glass obtained by employing a raw material of Composition A and a crystallizing temperature of 700° C. was measured at room temperature according to the same method as mentioned above. As a result, the bending strength was 150 MPa.

Next, examples in which a texture was formed on a magnetic disc substrate body according to the second aspect with laser beam will be described.

EXAMPLE 6

Powdery compounds containing respective metals were mixed to give a compounding ratio of 76.1 wt % of $SiO_2$, 9.9 wt % of $Li_2O$, 7.1 wt % of $Al_2O_3$, 2.8 wt % of $K_2O$, 2.0 wt % of $ZrO_2$, 1.9 wt % of $P_2O_5$, and 0.2 wt % of $Sb_2O_3$. At that time, an additive shown in Table 10 was added at a proportion (parts by weight) shown in FIG. 10 relative to 100 parts by weight of the resulting mixed powder when calculated in the form of an oxide. The resulting mixture was placed in a platinum crucible, and melted by heating at 1450° C. for 5 hours. The melt was press molded, thereby obtaining a glass preform having a round disc shape.

Crystal nuclei were formed by holding the resulting glass preform at 520° C. in an nitrogen atmosphere for one hour, and then the glass was heated at a heating rate of 100° C./hour, held at 730° C. for 2 hours, and cooled to room temperature. Thereby, a substrate material made of a crystallized glass was obtained.

A crystalline phase of this substrate material was identified by the X-ray diffraction method using a Kα line of copper. As a result, only crystalline phase of lithium disilicate was observed with respect to the experimental samples excluding Experimental No. 6-18.

In Experimental No. 6-18, the lithium disilicate phase and the β-eucryptite phase were observed. At that time, the intensity of the peak (2θ=26.1°) of the β-eucryptite phase was 200, when the intensity of the peak (2θ=24.8°) of the lithium disilicate phase was taken as 100. Then, when the crystallization was effected at a lowered crystallizing temperature of 680° C., the intensity of the peak of the β-eucryptite phase was 35, when the intensity of the peak of the lithium disilicate phase was taken as 100. Therefore, this sample was used.

Opposite surfaces of each substrate material were plane-polished to a flatness of 8 μm in a thickness of 0.75 mm by using a diamond grinding stone. Then, the polished opposite surfaces were lapped by using GC grinding particles, thereby obtaining a finely polished body in a thickness of 0.64 mm. Thereafter, the finely polished body was finish polished to a thickness of 0.635 mm by using cerium oxide grinding particles, thereby obtaining a magnetic disc substrate. The center line average surface roughness of the thus treated surfaces was 6 to 9 Å, and their flatness was within 5 μm.

The surface of the above magnetic disc substrate was worked by irradiating a YAG fourth harmonic pulse laser beam (wavelength: 266 nm, pulse oscillation, Q switch) thereon. At that time, the working condition was that the oscillation frequency was 2 kHz, the pulse width 25 nanoseconds, spot diameter 20 μm, and working speed 200 mm/sec with respect to the laser. While the output of the laser was being measured by a calorie meter type power meter, that output was varied and working was effected. The shape of the worked portion at which the laser beam was irradiated was measured by a light-interfering type surface roughness meter and a 3-dimension contacting needle type shape measuring unit.

The worked shapes obtained are shown in Table 10. With respect to the worked trace having a protuberant shape, its height is shown.

TABLE 10

| Experimental No. | Additive | Addition amount (part by weight) | Laser output (mw) | Worked shape | Height of protuberances (Å) |
|---|---|---|---|---|---|
| 6-1 | none | 0.00 | 200 | no worked trace | |
| 6-2 | $Fe_2O_3$ | 0.05 | 40 | hole | |
| 6-3 | $Fe_2O_3$ | 0.05 | 36 | protuberance | 840 |
| 6-4 | $Fe_2O_3$ | 0.05 | 32 | protuberance | 430 |
| 6-5 | $Fe_2O_3$ | 0.05 | 30 | protuberance | 200 |
| 6-6 | $Fe_2O_3$ | 0.05 | 28 | protuberance | 150 |
| 6-7 | $Fe_2O_3$ | 0.05 | 24 | no worked trace | |
| 6-8 | $Fe_2O_3$ | 0.20 | 28 | hole | |
| 6-9 | $Fe_2O_3$ | 0.20 | 24 | protuberance | 1500 |
| 6-10 | $Fe_2O_3$ | 0.20 | 20 | protuberance | 900 |
| 6-11 | $Fe_2O_3$ | 0.20 | 18 | protuberance | 270 |
| 6-12 | $Fe_2O_3$ | 0.20 | 16 | protuberance | 120 |
| 6-13 | $Fe_2O_3$ | 0.20 | 14 | no worked trace | |

TABLE 10-continued

| Experimental No. | Additive | Addition amount (part by weight) | Laser output (mw) | Worked shape | Height of protuberances (Å) |
|---|---|---|---|---|---|
| 6-14 | $Fe_2O_3$ | 0.15 | 18 | protuberance | 200 |
| 6-15 | $Fe_2O_3$ | 0.32 | 8 | protuberance | 180 |
| 6-16 | $Fe_2O_3$ | 0.48 | 2 | protuberance | 150 |
| 6-17 | $Fe_2O_3$ | 1.60 | 0.5 | protuberance | 200 |
| 6-18 | $Fe_2O_3$ | 3.20 | 0.5 | hole | |

With respect to Experimental No. 6-1 in which no additive was added, working could not be effected even by raising the output of the laser to its maximum.

With respect to the crystallized glasses in which an additive was added at a respective proportion, excluding Experimental No. 6-1, the shape of the working trace was "no worked trace" when the output of the laser was small, and took a swelled protuberant shape when the output of the laser was large. Further, when the output of the laser was raised a hole was formed. At that time, although a ring-shaped swelled portion was formed around the hole, the height of the swelled portion was around 500 Å irrespective of the output of the laser. Thus, such crystallized glasses could not be utilized for the texture having a target height of not more than 200 Å.

When the swelled protuberant shape was obtained, the height of the swelled portion was proportional to the output of the laser. The protuberances having the target height of not more than 200 Å could be obtained with the addition of an additive in a range of 0.05 parts by weight to 1.60 parts by weight.

As the addition amount of $Fe_2O_3$ was increased, the output of the laser required for obtaining the swelled protuberances decreased and its range was narrowed. In Experimental No. 6-18 in which 3.20 parts by weight of $Fe_2O_3$ was added, a hole was formed in a worked portion at an output of 0.5 mW. It is not practical to reduce the output of laser to less than this level, and the addition amount is preferably not more than 3 parts by weight.

EXAMPLE 7

Glass substrates for magnetic discs were produced by the same method as in Example 6, provided that the kind and the amount of the additive were varied as shown in Table 11.

The crystalline phase of the resulting substrate material was identified by the X-ray diffraction method using the Kα line of copper, and only the lithium disilicate was observed in each experimental samples.

The substrate material was finished to a magnetic disc substrate by working in the same manner as in Example 6. The center line average surface roughness Ra of the surface thereof was 7 to 8 Å, and the flatness was within 4 μm.

Next, the substrate was worked by irradiating a YAG fourth harmonic pulse laser beam thereupon, and the shape of the resulting worked portion was evaluated.

TABLE 11

| Experimental No. | Additive | Addition amount (part by weight) | Laser output (mw) | Worked shape | Height of protuberances (Å) |
|---|---|---|---|---|---|
| 7-1 | $V_2O_5$ | 0.50 | 18 | protuberance | 180 |
| 7-2 | $TiO_2$ | 0.48 | 60 | protuberance | 200 |
| 7-3 | $CeO_2$ | 1.00 | 60 | protuberance | 110 |
| 7-4 | CuO | 0.50 | 40 | protuberance | 160 |

As shown above, the swelled protuberances having the height of not more than 200 Å could be obtained, with respect to the crystallized glasses in which $V_2O_5$, $TiO_2$, $CeO_2$ or CuO was added, by adjusting the output of the laser.

EXAMPLE 8

Powdery compounds containing respective metals were mixed to give a compounding ratio of 76.2 wt % of $SiO_2$, 10.0 wt % of $Li_2O$, 6.5 wt % of $Al_2O_3$, 3.2 wt % of $K_2O$, 22.5 wt % of $ZrO_2$, 1.5 wt % of $P_2O_5$, and 0.1 wt % of $Sb_2O_3$. At that time, an additive shown in Table 12 was added at a proportion (parts by weight) shown in Table 12 relative to 100 parts by weight of the resulting mixed powder when calculated in the form of an oxide.

With respect to $Cr_2O_3$, it was added in the form of $K_2Cr_2O_7$ to given the parts by weight of $Cr_2O_3$ shown in Table 12.

The resulting mixture was placed in a platinum crucible, and melted by heating at 1450° C. for 5 hours. The melt was press molded, thereby obtaining a glass preform having a round disc shape.

TABLE 12

| Experimental No. | Additive and added rate (part by weight) | | | | | |
|---|---|---|---|---|---|---|
| | $Cr_2O_3$ | CoO | $MnO_2$ | NiO | CuO | total |
| 8-1 | 0.78 | 0.10 | 1.20 | | | 2.08 |
| 8-2 | 0.97 | 0.13 | 1.50 | | | 2.60 |
| 8-3 | 1.16 | 0.15 | 1.80 | | | 3.11 |
| 8-4 | 1.36 | 0.18 | 2.10 | | | 3.64 |
| 8-5 | 1.55 | 0.20 | 2.40 | | | 4.15 |
| 8-6 | 0.49 | 0.13 | 1.50 | | | 2.12 |
| 8-7 | 0.29 | 0.13 | 1.50 | | | 1.92 |
| 8-8 | | 1.00 | | | | 1.00 |
| 8-9 | | 2.00 | | | | 2.00 |
| 8-10 | | 2.50 | | | | 2.50 |
| 8-11 | | | | 2.00 | | 2.00 |
| 8-12 | | | | | 3.00 | 3.00 |

Next, an inner diameter and an outer diameter of the glass plate were worked in the same procedure as in Example 6, and the glass preform was crystallized. At that time, the crystallizing temperature was varied between 680° C. and 760° C.

The crystalline phase was identified in the same manner as in Example 6 by the X-ray diffraction method.

In Experimental samples, as the crystallizing temperature increased, there was tendency that the intensity of the peak of the β-eucryptite phase increased. When the crystallization was effected at the same temperature, there was tendency in Experimental Nos. 8-1 to 8-5 and 8-8 to 8-10 that as the addition amount was increased, the intensity of the peak of the β-eucryptite phase increased. In experiments were used samples in which the intensity of the peak (2θ=26.1°) of the β-eucryptite phase was not more than 40, when the intensity of the peak (2θ=24.8°) of the lithium disilicate phase was taken as 100.

The sample was finish worked to a magnetic disc substrate in the same manner as in Example 6. The center line average surface roughness Ra and the flatness of the finished surface were 7–10 Å and within 5 μm, respectively.

The surface of the above magnetic disc substrate was worked by irradiating a YAG secondary harmonic pulse laser beam (wavelength: 532 nm, CW oscillation, Q switch) thereon. At that time, the working condition was that the oscillation frequency was 1 kHz, the pulse width 75 nanoseconds, spot diameter 20 μm, and working speed 40 mm/sec with respect to the laser. While the output of the laser was being measured by a calorie meter type power meter, that output was varied and working was effected.

The shape of the worked portion at which the laser beam was irradiated was measured in the same manner as in Example 6, and measurement results are shown in Table 13.

TABLE 13

| Experiment No. | Laser output (mw) | Height of protuberances (Å) |
|---|---|---|
| 8-1 | 120 | hole |
| 8-1 | 100 | 2090 |
| 8-1 | 85 | 910 |
| 8-1 | 70 | 150 |
| 8-1 | 60 | no worked trace |
| 8-2 | 70 | hone |
| 8-2 | 60 | 2550 |
| 8-2 | 55 | 470 |
| 8-2 | 45 | 190 |
| 8-2 | 30 | no worked trace |
| 8-3 | 55 | hole |
| 8-3 | 45 | 3220 |
| 8-3 | 30 | 620 |
| 8-3 | 23 | 130 |
| 8-3 | 15 | no worked trace |
| 8-4 | 5 | 180 |
| 8-5 | 1 | 200 |
| 8-6 | 50 | 180 |
| 8-7 | 50 | 160 |
| 8-8 | 120 | 130 |
| 8-9 | 50 | 150 |
| 8-10 | 50 | 200 |
| 8-11 | 150 | 120 |
| 8-12 | 200 | 100 |

As the output of the laser increased, the shape of the worked portion obtained by working the crystallized glass with use of the YAG secondary harmonic pulse laser beam successively changed from "no worked trace", "swelled protuberant shape" and "hole bored" in this order as in the use of the YAG fourth harmonic pulse laser beam.

Even when the YAG secondary harmonic pulse laser beam was used, the texture having swelled protuberances of a target height of not more than 200 Å could be obtained by adjusting the output of the laser depending upon the kind and the amount of the additive.

EXAMPLE 9

A sample of Experimental No. 8-1 in Example 8 was worked by irradiating an argon laser beam (wavelength: 514 nm, CW oscillation) thereon. At that time, the working condition was that the output was 700 mW, spot diameter 50 μm, and working speed 4 mm/sec with respect to the laser. The working was effected in the state that the focus of the laser beam was moved upwardly of the sample.

The worked portion at which the laser beam was irradiated was swelled in the form of a protuberance in every Experimental sample where the focus-moved amount ranged from 0 mm to 1.2 mm (No hole was bored). The swelled shape was measured by the surface roughness meter, and results in Table 14 were obtained.

TABLE 14

| Focus-deviated amount (mm) | Height of protuberances (Å) |
|---|---|
| 0 | 33750 |
| 0.50 | 16680 |
| 1.00 | 4860 |
| 1.10 | 1670 |
| 1.13 | 830 |
| 1.15 | 330 |
| 1.20 | 160 |
| 1.22 | no worked trace |

As seen above, even when the argon laser CW beam was used, the texture having swelled protuberances of a target height of not more than 200 Å could be obtained by adjusting the density of the energy of the laser beam at the surface of the sample.

EXAMPLE 10

Powdery compounds containing respective metals were mixed to give a compounding ratio of 76.1 wt % of $SiO_2$, 9.9 wt % of $Li_2O$, 6.1 wt % of $Al_2O_3$, 2.8 wt % of $K_2O$, 3.0 wt % of $ZrO_2$, 1.9 wt % Of $P_2O_5$, and 0.2 wt % of $Sb_2O_3$. At that time, an additive shown in Table 15 was added at a proportion (parts by weight) shown in Table 15 relative to 100 parts by weight of the resulting mixed powder. The resulting mixture was placed in a platinum crucible, and melted by heating at 1450° C. for 5 hours. The melt was press molded, thereby obtaining a glass preform having a round disc shape. This round discoidal glass preform was ground to a dimension of 15 mm×15 mm×0.8 mm.

Crystal nuclei were formed by holding the resulting glass preform at 520° C. in an nitrogen atmosphere for one hour, and then the glass was heated at a heating rate of 100° C./hour, held at 710° C. to 730° C. for 4 hours, and cooled to room temperature. Thereby, a crystallized glass was obtained.

A crystalline phase of this substrate material was identified by the X-ray diffraction method using a Kα line of copper. The intensity of the peak (2θ=26.1°) of the β-eucryptite phase is shown in Table 15, when the intensity of the peak (2θ=24.8°) of the lithium disilicate phase is taken as 100.

The substrate material was finish polished to a thickness of 0.635 mm by using cerium oxide grinding particles as in the same manner as in Example 6. The surface roughness of the thus treated surfaces was measured by using the surface roughness meter with a contacting needle of 0.5 μm. The thus obtained center line average surface roughnesses Ra are shown in Table 15.

TABLE 15

| | Additive and added rate (part by weight) | | | | Crystallizing temperature | Ratio in peak | Surface roughness Ra |
|---|---|---|---|---|---|---|---|
| | $Fe_2O_3$ | $Cr_2O_3$ | CoO | $MnO_2$ | (° C.) | intensity | (Å) |
| 10-1 | 0.08 | | | | 730 | 0 | 7 |
| 10-2 | 1.60 | | | | 736 | 17 | 6 |
| 10-3 | 2.40 | | | | 730 | 31 | 10 |
| *10-4 | 3.20 | | | | 730 | 200 | 27 |
| 10-5 | 3.20 | 5.00 | | | 730 | 22 | 8 |
| 10-6 | | | 1.50 | | 730 | 18 | 9 |
| 10-7 | | | 2.50 | | 730 | 20 | 10 |
| *10-8 | | | 3.50 | | 730 | 76 | 16 |
| *10-9 | | 0.40 | 3.50 | | 730 | 55 | 13 |
| 10-10 | | | | 1.00 | 710 | 11 | 7 |
| 10-11 | | | | 2.00 | 710 | 28 | 10 |
| 10-12 | | | | 3.00 | 710 | 46 | 10 |
| *10-13 | | | | 4.00 | 710 | 87 | 17 |
| 10-14 | | 3.00 | | 4.00 | 710 | 32 | 9 |
| 10-15 | | 2.88 | 1.13 | 1.50 | 730 | 10 | 8 |
| 10-16 | | 1.94 | 1.13 | 1.50 | 730 | 28 | 9 |
| 10-17 | | | 1.13 | 1.50 | 730 | 41 | 10 |
| 10-18 | | 2.16 | 0.15 | 1.80 | 710 | 0 | 7 |
| 10-19 | | 1.56 | 0.15 | 1.80 | 710 | 26 | 9 |
| 10-20 | | 1.28 | 0.15 | 1.80 | 710 | 29 | 9 |

As is seen from Experimental Nos. 10-1, 10-2, 10-3, 10-4, 10-6, 10-7, 10-8, 10-10, 10-11, 10-12 and 10-13, there is tendency that the intensity of the peak of the β-eucryptite phase increases in proportion to the addition amount of the oxide added.

In order to suppress the center line average surface roughness to not more than 10 Å, the total or a single amount of the oxide(s) excluding chromium oxide preferably not more than 3 parts by weight.

However, as is seen from Experimental Nos. 10-5, 10-9, 10-14, 10-15, 10-16, 10-18, 10-19 and 10-20, the addition of chromium oxide functions to suppress the production of the β-eucryptite phase. The addition amount of chromium oxide is preferably not more than 10 parts by weight. If the addition amount exceeds 10 parts by weight, the amount of the crystals on crystallizing decreases to lower strength.

Even if the oxide(s) excluding chromium oxide was added in a total amount of not less than 3 parts by weight, the effect of suppressing the production of the β-eucryptite phase with chromium oxide can be utilized when chromium oxide is added in an amount of 0.5 parts by weight. The above oxides may be added in a total amount of not more than 10 parts by weight.

What is claimed is:

1. A process for producing a magnetic disc substrate, comprising the steps of:

polishing a surface of a glass magnetic disc substrate;

immersing the magnetic disc substrate into a melted salt of metal ions to incorporate a metallic element into at least the polished surface portion of the magnetic disc substrate, wherein said metallic element is capable of absorbing light having a wavelength of 1600 nm or less; and irradiating high energy having a wavelength of 1600 nm or less upon the polished surface of the magnetic disc substrate, whereby said metallic element allows formation of a textured area on the surface of said magnetic disc substrate.

2. The process for producing the magnetic disc substrate set forth in claim 1, wherein the magnetic disc substrate comprises a reading/writing zone for recording the reproducing signals and a landing zone with which a magnetic head slider, the textured area having protuberances at heights of 50 to 200 Å is formed by irradiating the high energy light having a wavelength of 1600 nm or less upon the landing zone after finely polishing the surface of the magnetic disc substrate such that an area of top portions of said protuberances amounts to 2 to 5% of a total area of the landing zone.

3. The process for producing the magnetic disc substrate set forth in claims 1, wherein a laser beam selected from the group consisting of a YAG laser beam and an argon laser beam is used as said high energy light having a wavelength of 1600 nm or less.

4. The process for producing the magnetic disc substrate set forth in claims 1, wherein each of the protuberances constituting said textured area has an arched planar shape extending in a circumferential direction.

* * * * *